United States Patent [19]

Fujioka

[11] Patent Number: 5,572,284

[45] Date of Patent: Nov. 5, 1996

[54] BOOK DOCUMENT HANDLING DEVICE

[75] Inventor: Tetsuya Fujioka, Yokohama, Japan

[73] Assignee: Ricoh Company, Ltd., Tokyo, Japan

[21] Appl. No.: 435,483

[22] Filed: May 5, 1995

[30] Foreign Application Priority Data

| May 11, 1994 | [JP] | Japan | 6-097757 |
| Oct. 20, 1994 | [JP] | Japan | 6-255665 |

[51] Int. Cl.$^6$ ............................................. G03G 21/00
[52] U.S. Cl. ............................ 399/362; 399/367; 399/377
[58] Field of Search ............................. 355/25, 308, 311, 355/309, 319, 75

[56] References Cited

U.S. PATENT DOCUMENTS

| 3,594,079 | 7/1971 | Murgas et al. . | |
| 4,017,173 | 4/1977 | Komori et al. . | |
| 4,080,070 | 3/1978 | Spence-Bate | 355/75 |
| 4,218,130 | 8/1980 | Satomi et al. . | |
| 4,645,331 | 2/1987 | Berger . | |
| 4,659,207 | 4/1987 | Maekawa . | |
| 4,673,286 | 6/1987 | Shinbrot . | |
| 4,688,930 | 8/1987 | Ohno . | |
| 4,693,594 | 9/1987 | Garavuso et al. . | |
| 4,823,395 | 4/1989 | Chikauchi . | |
| 4,856,769 | 8/1989 | Andrew et al. . | |
| 4,916,839 | 4/1990 | Nakanishi . | |
| 4,942,482 | 7/1990 | Kakinuma et al. . | |
| 4,972,271 | 11/1990 | Koumura . | |
| 4,982,235 | 1/1991 | Fujino . | |
| 4,985,617 | 1/1991 | Ogushi . | |
| 5,077,577 | 12/1991 | Hamakawa . | |
| 5,084,732 | 1/1992 | Tsaur et al. . | |
| 5,119,136 | 6/1992 | Morikawa . | |
| 5,325,213 | 6/1994 | Takahashi et al. . | |

FOREIGN PATENT DOCUMENTS

| 54-21836 | 2/1979 | Japan . |
| 56-60294 | 5/1981 | Japan . |
| 56-81831 | 7/1981 | Japan . |
| 57-208300 | 12/1982 | Japan . |
| 60-12114 | 4/1985 | Japan . |
| 60-122932 | 7/1985 | Japan . |
| 61-184527 | 8/1986 | Japan . |
| 61-284492 | 12/1986 | Japan . |
| 62-35891 | 2/1987 | Japan . |
| 62-99737 | 5/1987 | Japan . |
| 62-267196 | 11/1987 | Japan . |
| 63-47197 | 2/1988 | Japan . |
| 63-58427 | 3/1988 | Japan . |
| 4-48867 | 2/1992 | Japan . |
| 6-202246 | 7/1994 | Japan . |
| 6-253109 | 9/1994 | Japan . |
| 6-250296 | 9/1994 | Japan . |

OTHER PUBLICATIONS

Popular Science magazine, Oct. 1994, p. 42.

*Primary Examiner*—Nestor R. Ramirez
*Attorney, Agent, or Firm*—Oblon, Spivak, McClelland, Maier & Neustadt, P.C.

[57] ABSTRACT

A book document handing device for an image forming apparatus, and having a function of reading a book document and a function of turning the pages of the document. A scanning unit having the two functions is moved in a reciprocating motion on and along the surface of a book document laid spread on a right and a left document tables, thereby reading the document while turning the pages thereof. A table unit has, in addition to the right and left tables, a mechanism for moving each table up and down independently of the other table, members for fixing the front and rear covers of the book document to the two tables, and slide rails supporting the table unit in such a manner as to be movable in the front-and-rear direction relative to the body of the device.

20 Claims, 37 Drawing Sheets

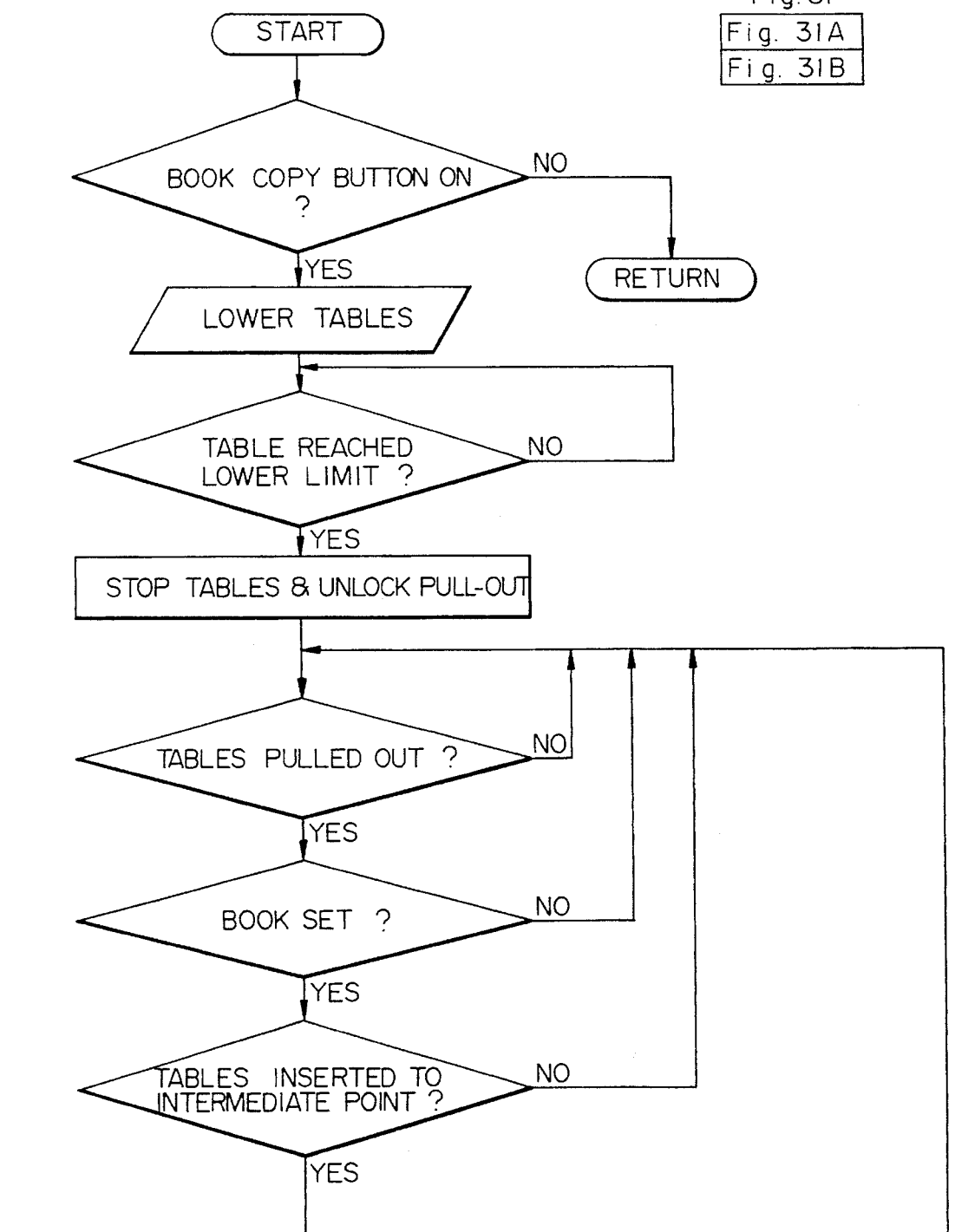

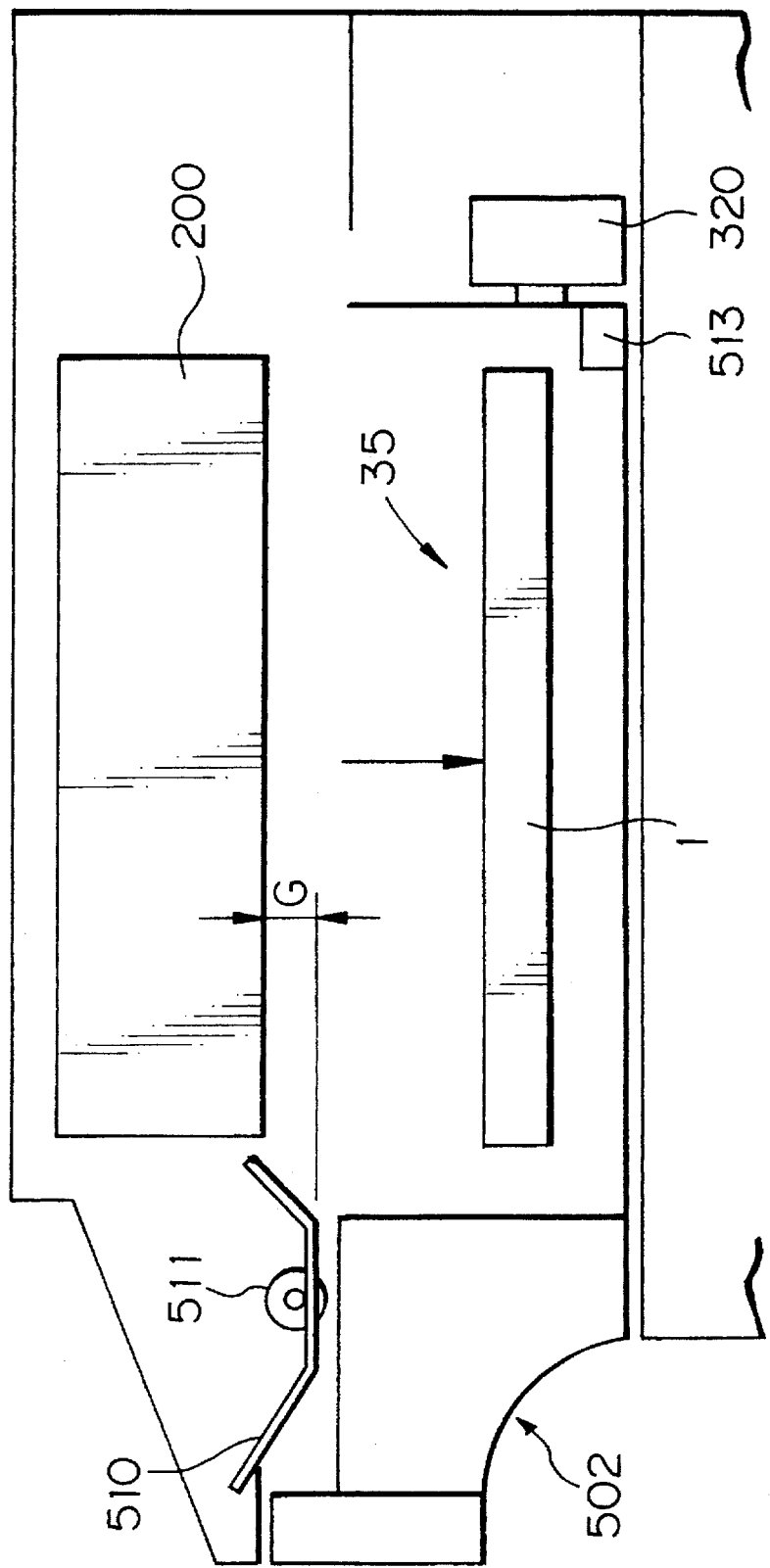

BOOK DOCUMENT HANDLING DEVICE

BACKGROUND OF THE INVENTION

The present invention relates to a book document handling device for a copier, facsimile apparatus or similar image forming apparatus, and capable of reading a book document and turning over the pages of the document.

A book document handling device capable of reading the spread pages of a book document and then automatically turning over the page has recently been proposed in various forms. The problem with this kind of device is that when the right and left pages of a book laid on a table in a spread position are different in level, a scanning unit scanning the document rises or falls due to a step formed between the spread pages. The scanning unit, therefore, fails to read the book or to turn the pages stably. Hence, it is preferable that the right and left pages of the book be maintained flush with each other at all times.

To hold the spread pages of a book flush with each other, Japanese Patent Laid-Open Publication No. 61-184527 teaches a see-saw type document supporting device. This device urges the spread pages of a book against a single flat glass sheet overlying the document. However, although the glass sheet allows the scanning unit to read the spread pages stably, it prevents the scanning unit from turning the pages because it intervenes between the scanning unit and the book. As a result, the automatic page turning function particular to this kind of device is not available. In addition, a stable pressure is not achievable with the see-saw type device because the book is pressed against the glass sheet by the manual operation of a handle.

Japanese Utility Model Publication No. 60-12114 discloses a platen device for a copying a book. The platen device has a base and a pair of independent document tables mounted on the base. The tables are each movable up and down and constantly biased upward by a resilient member. A platen covers the upper surfaces of the tables and is selectively openable. The spread pages of a book are read through the platen. This kind of approach also has a problem that when the platen is present over the spread book, it is extremely difficult to turn the page of the book. If the platen is removed, it is likely that the book document is caught or torn off when the base or tables are inserted into the body of the device. Further, because the device constantly biases the book upward, the operator must set it while pressing the spread pages downward. Moreover, because the book is simply laid on the tables, it will be displaced if the platen is absent, resulting in skewed images. Therefore, the platen is essential with this device and cannot be removed. This kind of device is not applicable to a device for reading a book while turning the pages thereof.

Other book document handling devices are taught in the following documents:

Japanese Patent Laid-Open Publication No. 4-38867;
Japanese Patent Laid-Open Publication No. 6-250296
Japanese Patent Laid-Open Publication No. 62-99737
Japanese Patent Laid-Open Publication No. 54-21836
Japanese Patent Laid-Open Publication No. 61-284492
Japanese Patent laid-Open Publication No. 56-60294
Japanese Patent Laid-Open Publication No. 60-122932
Japanese Patent Laid-Open Publication No. 63-47197
Japanese Patent Laid-Open Publication No. 62-35891
Japanese Patent Laid-Open Publication No. 62-267196
Japanese Patent Laid-Open Publication No. 57-208300
U.S. Pat. Nos. 4,693,594 5,325,213
4,017,173 4,218,130
4,659,207 4,673,286
4,688,930 4,916,839
4,942,482 4,972,271
5,077,577 5,084,732
4,982,235 4,856,769
4,985,617 5,119,136
4,823,395 3,594,079
4,645,331

However, the devices taught in the above documents also have the problems discussed or bring about other problems although not described specifically.

SUMMARY OF THE INVENTION

It is, therefore, an object of the present invention to provide a book document handling device capable of reading the spread pages of a book document and turning the pages while ensuring and facilitating the setting of the document and preventing the document from being displaced, caught or torn off.

In accordance with the present invention, a book document handling device has a document table for laying a book document in a spread position with the spread pages of the book document facing upward, a page turning device for turning the pages of the book document by scanning the spread pages, a reading device for reading the book document, and a scanning unit supporting the page turning device and reading device for allowing them to scan the book document. The scanning unit is movable in a reciprocating motion for turning the pages of the book document while reading the book document. The document table has a pair of separate document tables positioned side by side in a right-and-left direction, a moving mechanism for causing the document tables to move up and down independently of each other, a fixing device for fixing the front and rear covers of the book document to the document tables, respectively, and a support mechanism for supporting the document tables in such a manner as to be movable relative to the body of the device in a front-and-rear direction.

Further, in accordance with the present invention, a book document handling device has a document table for laying a book document in a spread position with the spread pages of the book document facing upward, a page turning device for turning the pages of the book document by scanning the spread pages, a reading device for reading the book document, and a scanning unit supporting the page turning device and reading device for allowing them to scan the book document. The scanning unit is movable in a reciprocating motion for turning the pages of the book document while reading the book document. The document table has a pair of separate document tables positioned side by side in a right-and-left direction, a moving mechanism for causing the document tables to move tip and down independently of each other, a fixing device for fixing the front and rear covers of the book document to the document tables, respectively, a support mechanism for supporting the document tables in such a manner as to be movable relative to the body of the device in a front-and-rear direction, and a control device for causing the moving mechanism to lower the document tables when the tables are pulled out of the body or to raise them when them are pushed into the body.

Moreover, in accordance with the present invention, a book document handling device has a document table for laying a book document in a spread position with the spread pages of the book document facing upward, a page turning device for turning the page of the book document by scanning the spread pages, a reading device for reading the book document, a scanning unit supporting the page turning device and reading device for allowing them to scan the book document, and a scanner unit supporting the scanning unit and movable in a reciprocating motion for turning the pages of the book document while reading the book document. The document table has a pair of separate document tables positioned side by side in a right-and-left direction, a moving mechanism for causing the document tables to move up and down independently of each other, a fixing device for fixing the front and rear covers of the book document to the document tables, respectively, and a support mechanism for supporting the document tables in such a manner as to be movable relative to the body of the device in a front-and-rear direction. The scanner unit is positioned above the document table, forms part of the body, and is hinged to the body to allow the document table to be exposed to the outside when the document table is set in the body.

BRIEF DESCRIPTION OF THE DRAWINGS

The above and other objects, features and advantages of the present invention will become apparent from the following detailed description taken with the accompanying drawings in which:

FIGS. 32–37 are vertical sections each showing the embodiment in a particular condition to occur during the course of the setting of the book;

DESCRIPTION OF THE PREFERRED EMBODIMENTS

Preferred embodiments to be described are each implemented as, but not limited to, a single unit having a page turning function and an image reading function.

Figure 1:
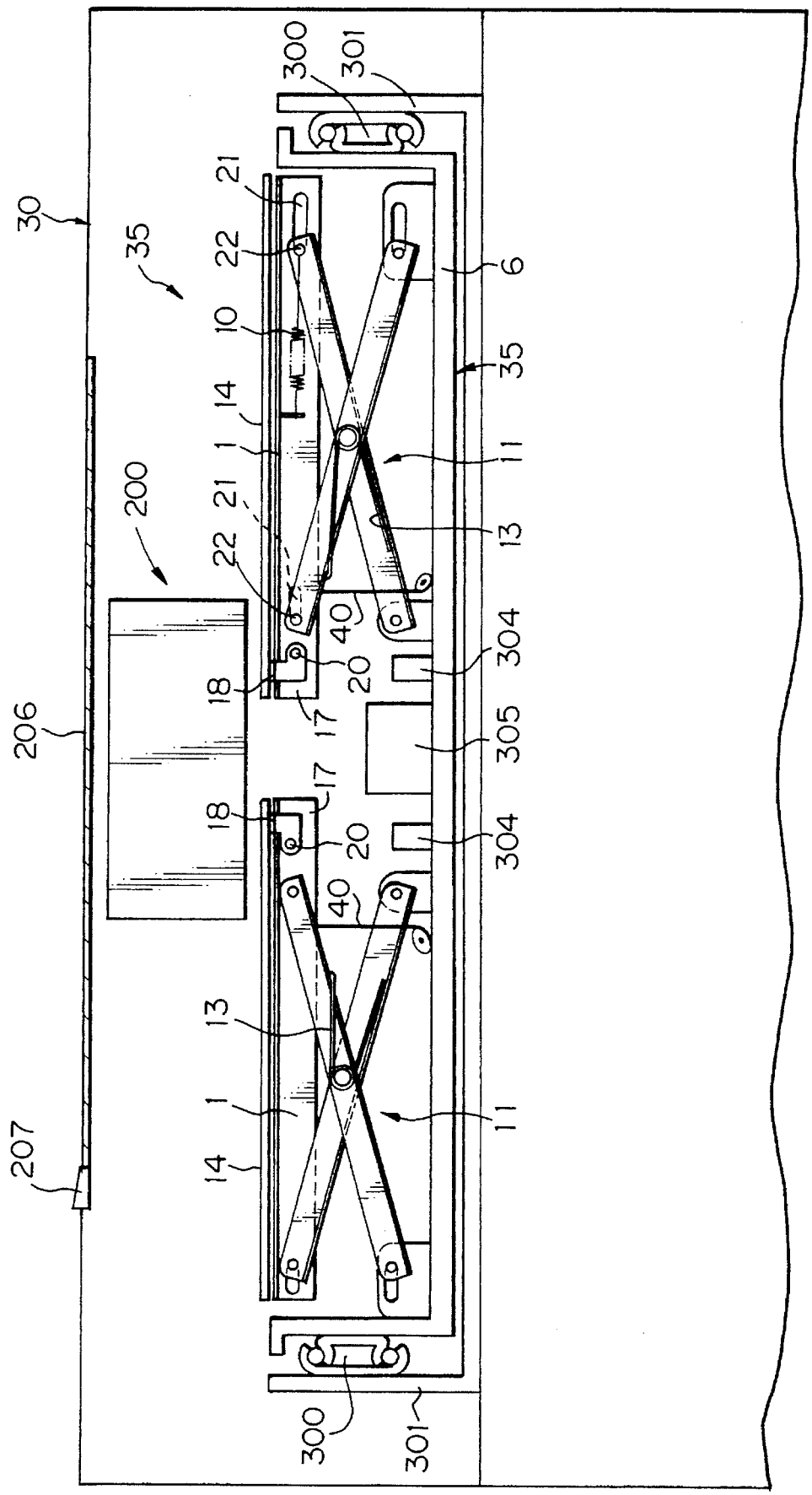
FIG. 1 is a section showing a book document handling device embodying the present invention.

Referring to FIG. 1 of the drawings, a book document handling device or TPS (Turn the Page Scanner) embodying the present invention is shown. As shown, the TPS has a contact glass 206 and a scale 207 mounted on the top of a housing. A sheet document or a spread book document may be laid on the contact glass 206. After the document has been set by a cover plate, not shown, a scanning unit 200 reads the image of the document by scanning it. The upper half of the casing is implemented as a scanner unit 30. The scanning unit 200 is disposed in the scanner unit 30 and movable in a right-and-left direction as seen in FIG. 1.

Figure 2:
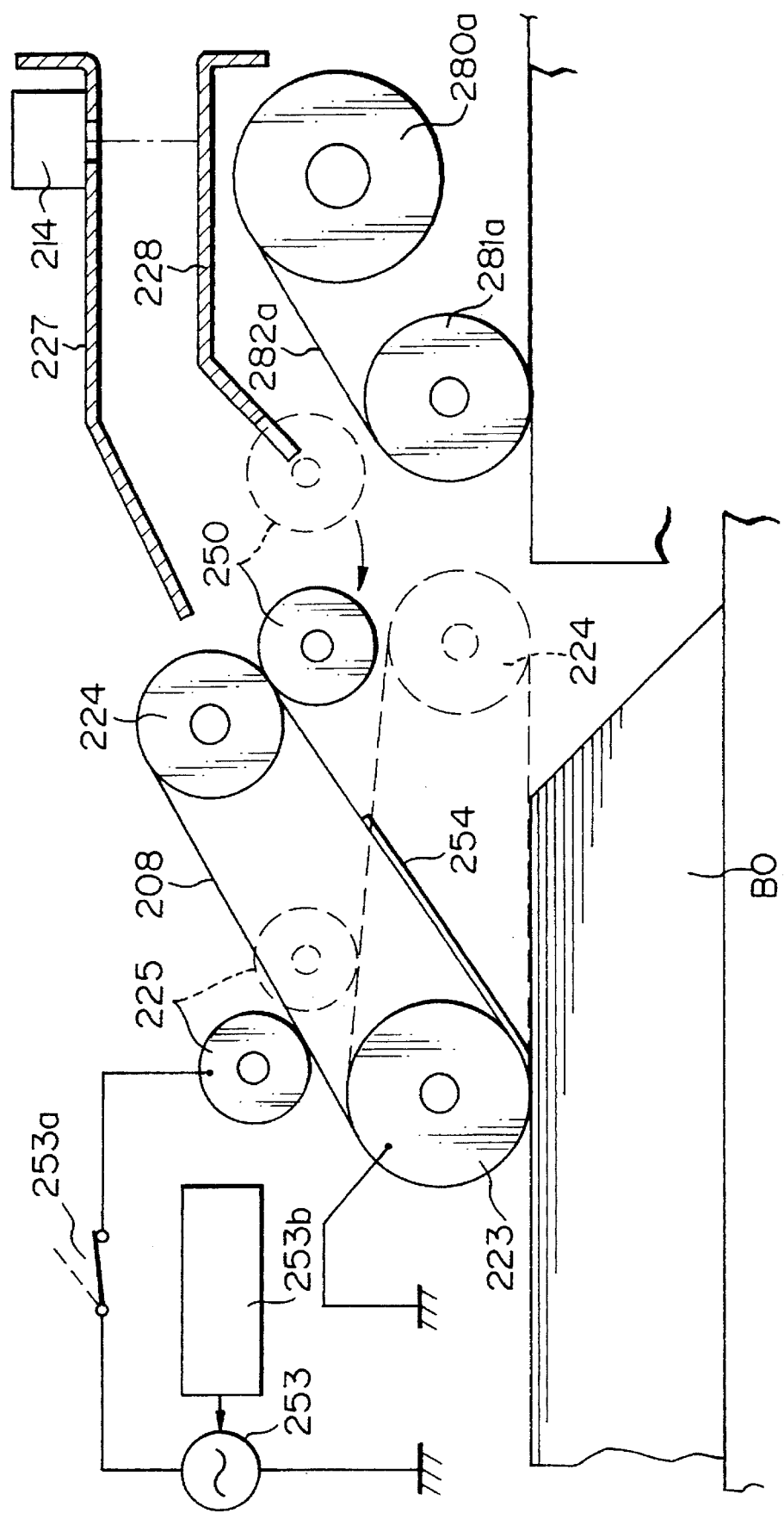
FIG. 2 is a fragmentary section of a scanning unit included in the embodiment and showing how the unit lifts the leaf of a book document.

A page turning section included in the scanning unit 200 is shown in FIG. 2 and has a belt 208. In the illustrative embodiment, the belt 208 is made of PET, PC or PVC by way of example. The belt 208 has a double-layer resin film structure, i.e., a front layer implemented by a film whose resistance is higher than $10^{14}\Omega$, and a rear layer implemented by a film whose resistance is lower than $10^{8}\Omega$. A drive roller 223 for driving the belt 208 is made up of a metallic core connected to ground, and conductive rubber covering the surface of the core. With this structure, the drive roller 223 surely drives the belt 208 while being surely connected to ground. A charge roller 225 is a metallic roller or a roller having a metallic core covered with conductive rubber. An AC high-tension power source 253 applies a high voltage of ±2 kV to ±4 kV to the charge roller 225 via a switch 253a at a predetermining time.

Figure 9A:
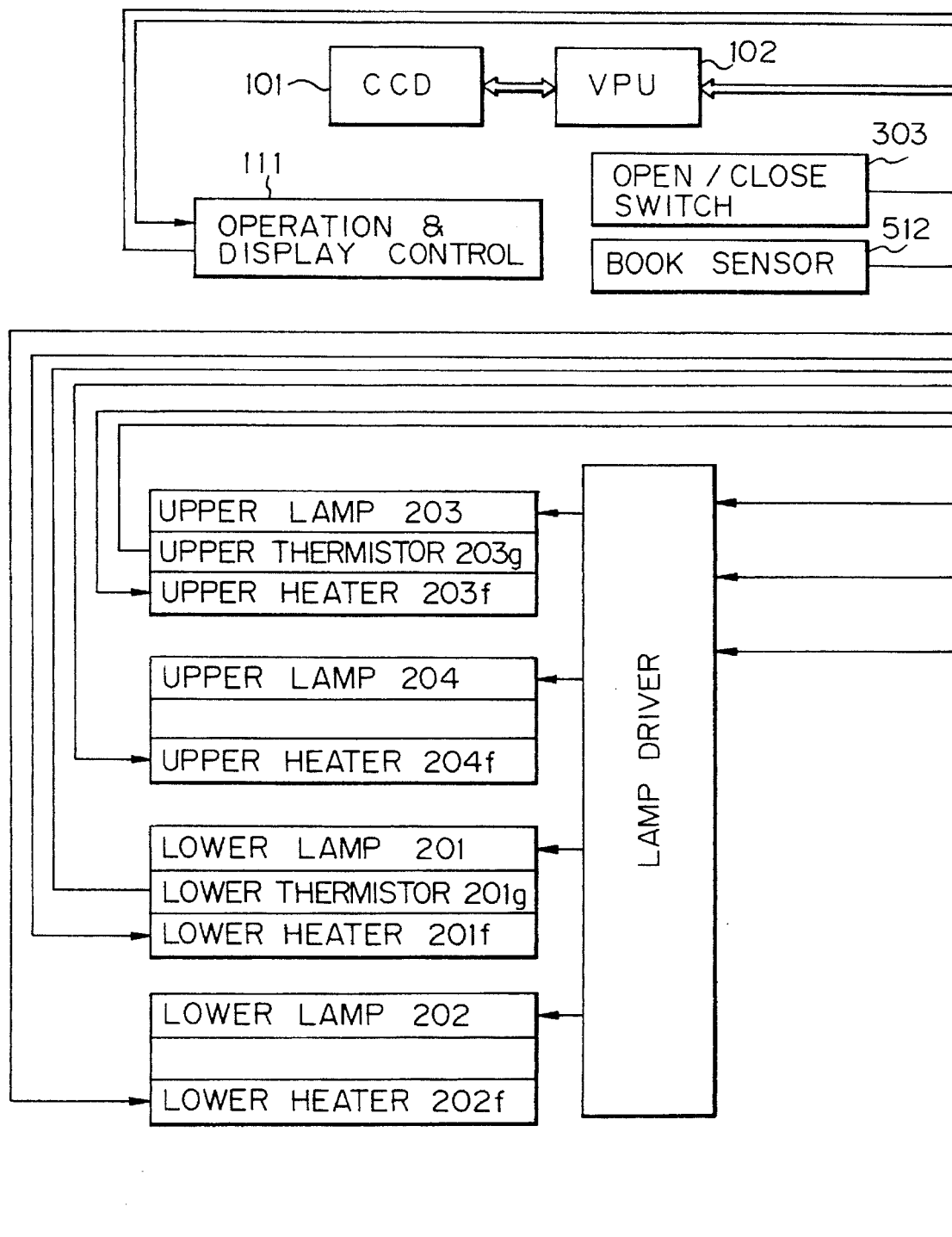
FIG. 9 is a block diagram schematically showing a control system included in the embodiment.
Figure 9B:
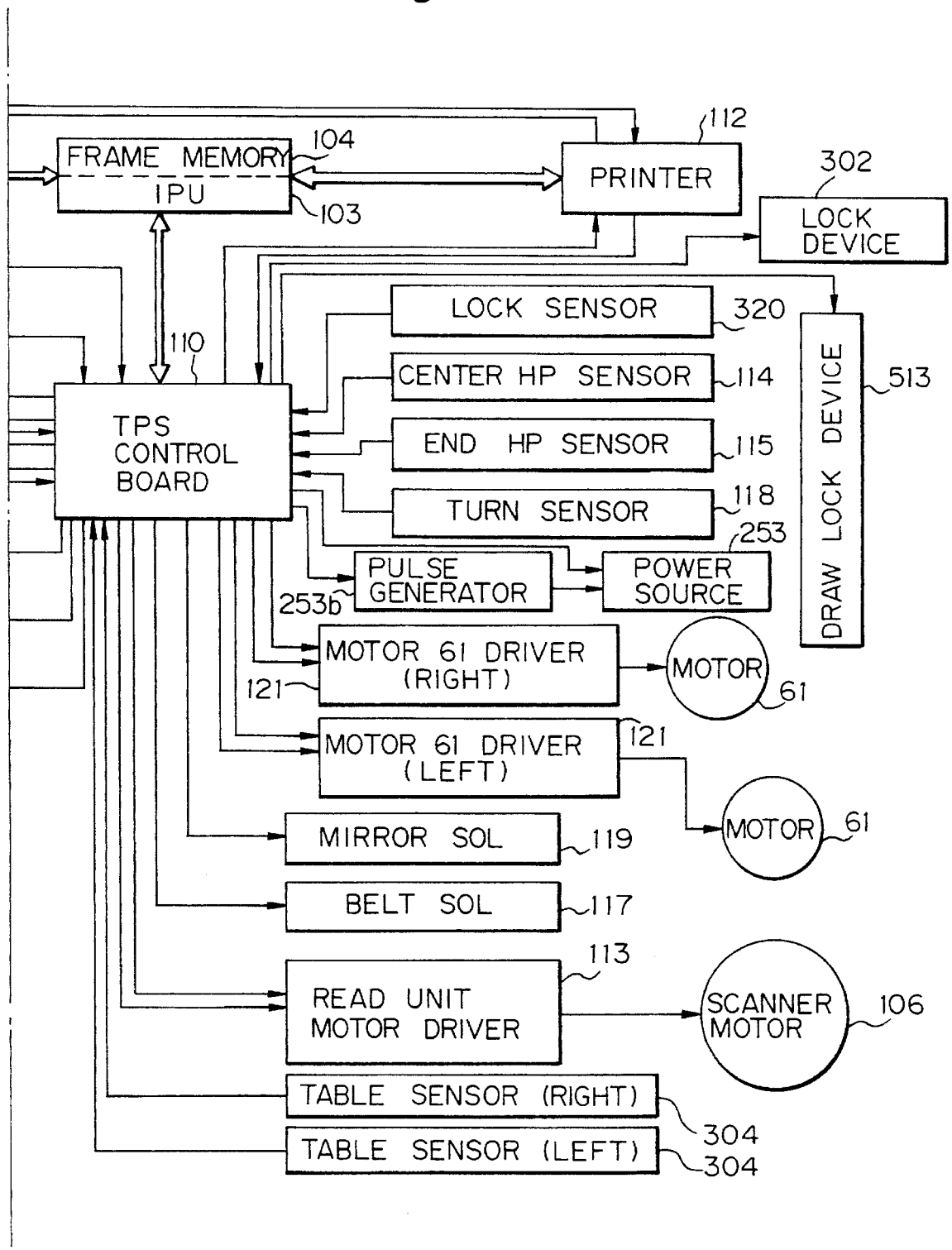

FIG. 2 shows a condition wherein the belt 208 is positioned on the top page 254 of a spread book document, or simply book as referred to hereinafter, BO. While the scanning unit 200 is in travel and the belt 208 is in rotation, the switch 253a is turned on at a particular timing which will be described. As a result, the high voltage, matching the frequency of a pulse generator 253b, is applied from the power source 253 to the charge roller 225. The voltage causes an alternating electric field to appear on the surface of the belt 208. Consequently, the top page 254 of the book BO is electrostatically adhered to the surface of the belt 208. The frequency of the pulse generator 253b is variable under the control of a TPS control board 110 (FIG. 9). The power source 253 is disposed in the scanning unit 200, so that the high-tension harness thereof is confined in the unit 200. This is desirable from the safety operation standpoint, compared to the other power feed lines and signal lines.

Figure 3:
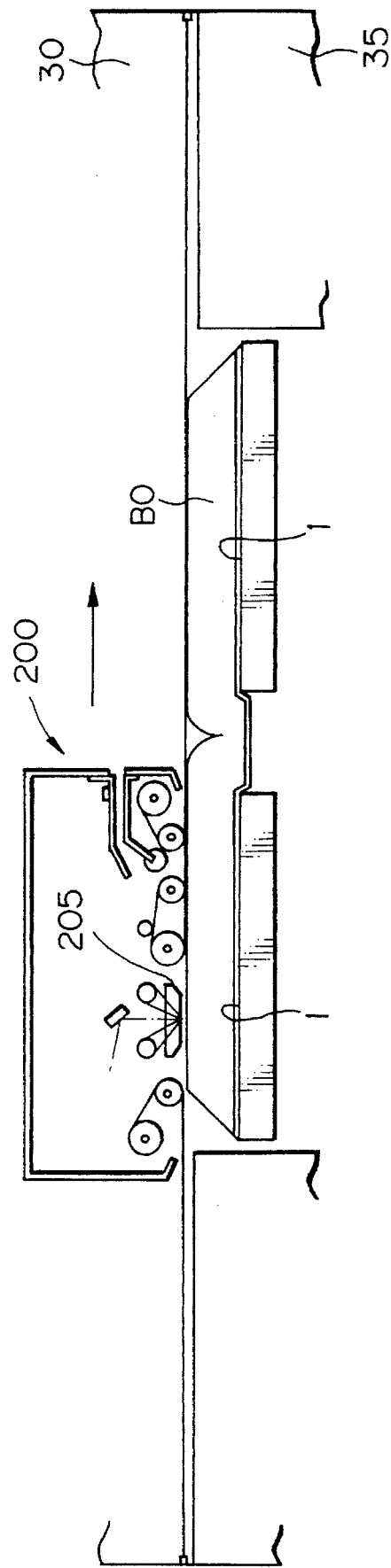
FIGS. 3–8 are views demonstrating the movement of the scanning unit to occur in a page turn mode.

As shown in FIG. 3, at the beginning of scanning, the scanning unit 200 is located at a home position defined at the left end of the scanner unit 30. The unit 200 sequentially moves from the home position to the right as viewed in FIG. 3. At this instant, the belt 208 and a page feed roller 250 are each brought to a position indicated by a solid line in FIG. 2 by a respective solenoid, not shown. A platen glass 205 is also included in the unit 200. As shown in FIG. 3, when the reading position of the platen glass 205 arrives at the left page of the spread book BO, optics built in the unit 200 starts reading the left page. The position where the unit 200 starts reading the book BO, i.e., read start position is changed by the control board 110 on the basis of the size of the book BO. Specifically, the control board 110 is responsive to a document size input on an operation and display control 111 by the operator or to the output of size sensing means, not shown. Further, this read start position differs from a read start position defined on the contact glass 206 (reference edge of the scale 207).

Figure 4:
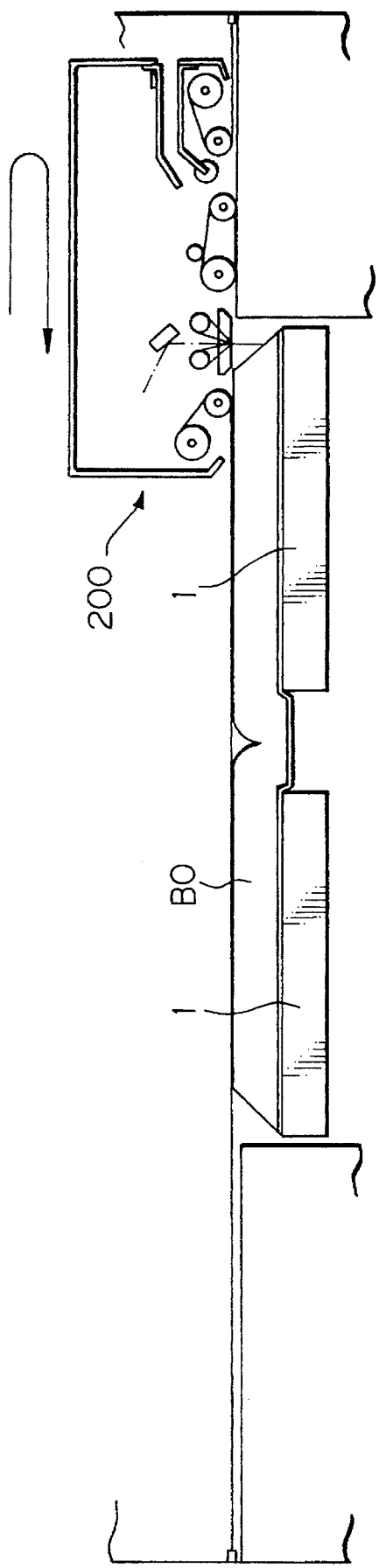

The optics of the scanning unit 200 sequentially reads the spread book BO from the left page to the right page, as shown in FIG. 3. During this part of the operation, the belt 208 and page feed roller 250 are held in the solid line positions shown in FIG. 2. As shown in FIG. 4, when the optics fully reads the book BO up to the end of the right page, the scanning direction of the unit 200 is reversed. At this instant, the belt 208 and roller 250 are each brought to a phantom line position shown in FIG. 2. Substantially at the same time, the pulse generator 253b and power source 253 are driven to apply the AC high voltage of predetermined frequency to the charge roller 225. As a result a charge pattern is formed on the front of the belt 208.

Figure 5:
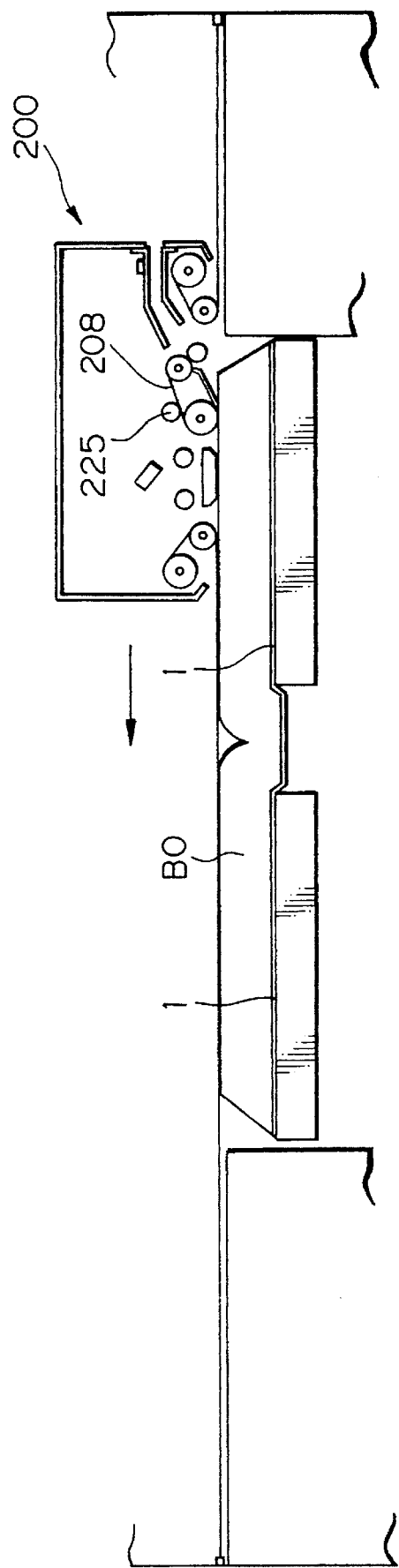

Prior to the beginning of page turning, the charge pattern of the belt 208, held in the phantom line position shown in FIG. 2, overlies the top page 254 of the book BO. As shown in FIG. 5, when the center of the bottom of the belt 208 goes beyond the edge of the top page 254, the belt 208 and roller 250 are returned to the solid line positions shown in FIG. 2. The time for so returning the belt 208 and roller 250 is also changed on the basis of the size of the book BO under the control of the TPS control board 110 in response to the previously mentioned manual input or the output of the sensing means. Only the top page 254 is electrostatically adhered to the belt 208 due to the charge pattern or unequal electric field formed on the belt 208. As a result, the edge of the top page or leaf 254 is lifted together with the belt 208.

Figure 6:
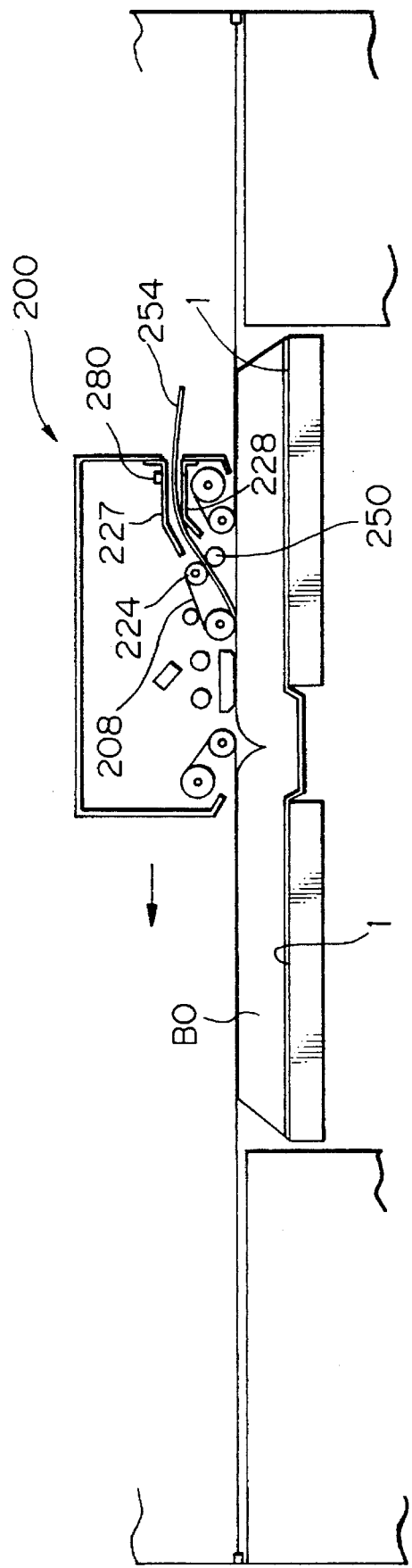

After the top leaf 254 has been lifted by the belt 208, the scanning unit 200 is moved toward the home position, as shown in FIG. 5. As a result, as shown in FIG. 6, the leaf 254 is surely nipped and conveyed by the page feed roller 250 and a turn roller 224. The edge of the leaf 254 is driven out of the scanning unit 200 via an upper guide 227 and a lower guide 228 located at the right end of the unit 200. A turn sensor 214 (FIG. 2) is mounted on the upper guide 227. Whether or not the leaf 254 has been successfully turned over is determined on the basis of the output of the sensor 214.

Figure 7:
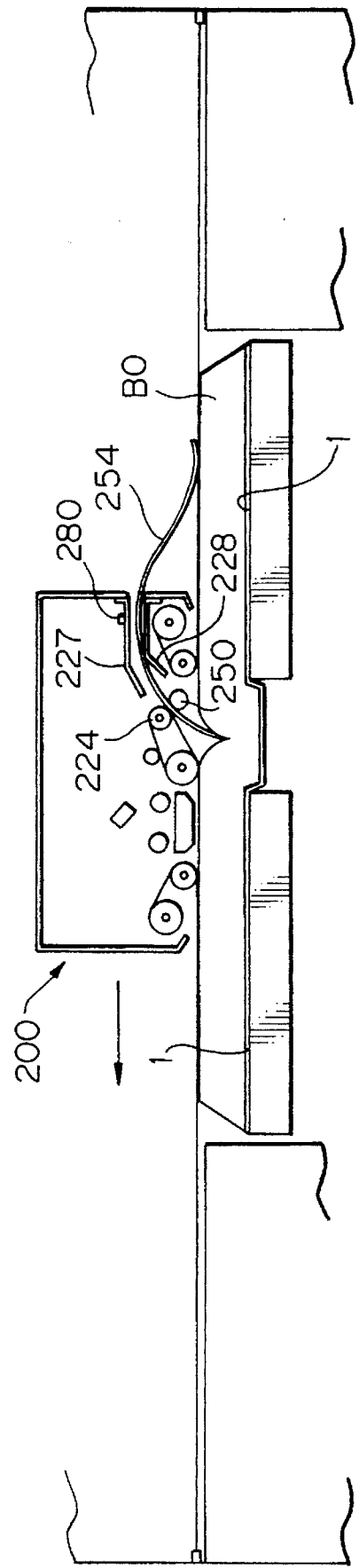
Figure 8:
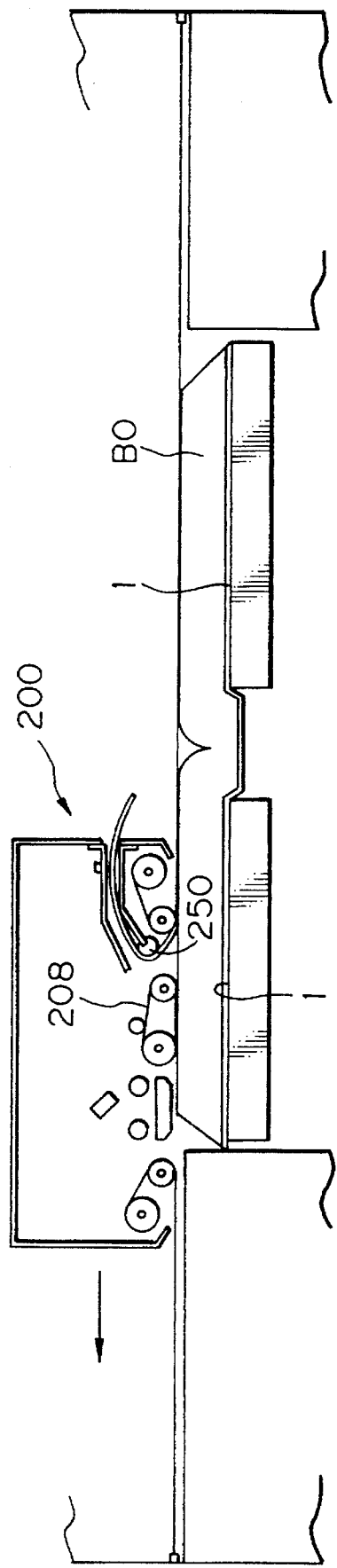

As shown in FIG. 7, after the leaf 254 has been lifted up to the bound portion of the spread book BO, the belt 208 and roller 250 are again moved to the phantom line positions shown in FIG. 2. As shown in FIG. 8, as the scanning unit 200 is further moved toward the home position, the leaf 254 is pulled by the bound portion of the book BO. Consequently, the leaf 254 is discharged from the unit 200 while returning via the gap between the guides 227 and 228. When the leaf 254 is fully driven out of the unit 200 and laid on the left, page of the book BO, a single document reading and page turning procedure ends. When it is desired to repeat only a document reading procedure or a page turning procedure, the moving direction of the unit 200 is reversed immediately after the leaf 254 has been fully laid on the left page. This implements the reciprocating motion of the unit 200 over the shortest course. The unit 200 sometimes performs only the book reading procedure or only the page turning procedure, as the case may be.

Referring to FIG. 9, a TPS control system is shown and includes the TPS control board 110. The control board 110 has a CPU (Central Processing Unit), external ROM (Read Only Memory), I/O (Input/Output), timer, and serial interface and controls the entire TPS. The control board 110 is connected to the operation and display control 111 and a printer 112 by serial interfaces so as to interchange commands and data therewith. A scanning unit driver 113 causes the scanning unit 200 to scan a document by reversibly driving a scanner motor 106. Before the unit 200 scans a document, the home position of the unit 200 is detected on the basis of the outputs of a center HP (Home Position) sensor 114 and an end HP sensor 115. During the course of document reading, the position sensed by the center HP sensor 114 is the start position of the unit 200.

A belt up-down solenoid 117 causes the belt 208, to which the leaf 254 of the book 30 has been electrostatically adhered, to rise and thereby lift the edge of the leaf 254 toward the unit 200. A turn sensor 118 determines whether or not the leaf 254 has been successfully turned over. If the sensor 118 does not sense the leaf 254 at a predetermined time, the unit 200 repeats the page turning operation.

Figure 10:
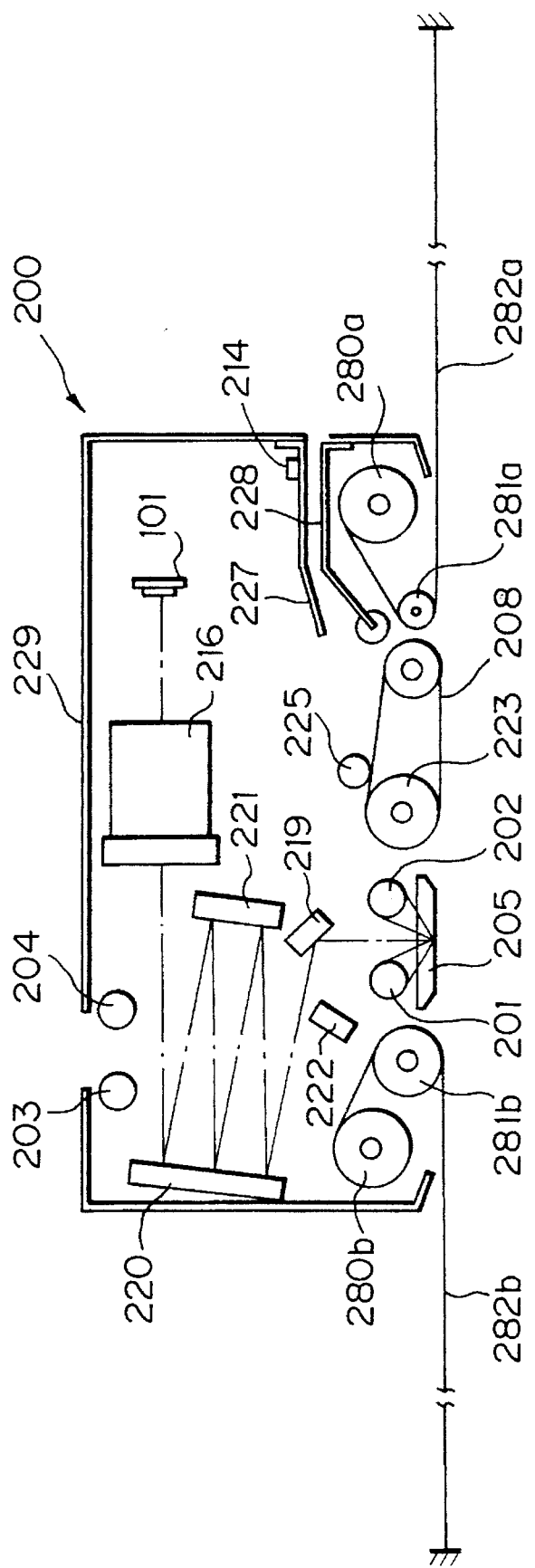
FIG. 10 is a section showing the general construction of the scanning unit.

As shown in FIG. 10, the unit 200 has two different optical paths, i.e., a lower optical path exclusively assigned to the book BO, and an upper optical path available for both sheet documents and book documents. In FIG. 9, a mirror solenoid 119 selects one of the two optical paths and is implemented by a keep solenoid; it is energized only at the time of path switchover. A pair of fluorescent lamps 201 and 202 and a pair of fluorescent lamps 203 and 204 are associated with the lower optical path and upper optical path, respectively. The lamps 201–204 are each controlled by a respective lamp driver. Heaters 201f, 202f, 203f and 204f are respectively mounted on the lamps 201, 202, 203 and 204. Further, thermistors 201g and 203g are respectively mounted on the lamps 201 and 203. These heaters and thermistors control the temperature of the associated lamps. While the lamps 201–204 are shown as being connected to a single lamp driver 120, only two circuits are provided for turning on the lamps 201–204. Specifically, circuitry for selecting either the lower lamps 201 and 202 or the upper lamps 203 and 204 in response to a signal from the TPS control board 110 is built in the lamp driver 120.

As shown in FIG. 10, a document image illuminated by the lamps is incident to a CCD (Charge Coupled Device)

image sensor 101 via a mirror 222 or mirrors 219, 220 and 221, and a lens 216. The image sensor 101 is connected to a VPU (Video Processing Unit) 102 (FIG. 9). The VPU 102 transforms an analog image signal output from the image sensor 101 to digital values and delivers them to the printer 112 via a frame memory 104 and an IPU 103 (Image Processing Unit). The frame memory 104 plays the role of a buffer for the reading linear velocity of the TPS and the processing linear velocity of the printer 112. The IPU 103 processes the input image data in a conventional manner.

Figure 11:
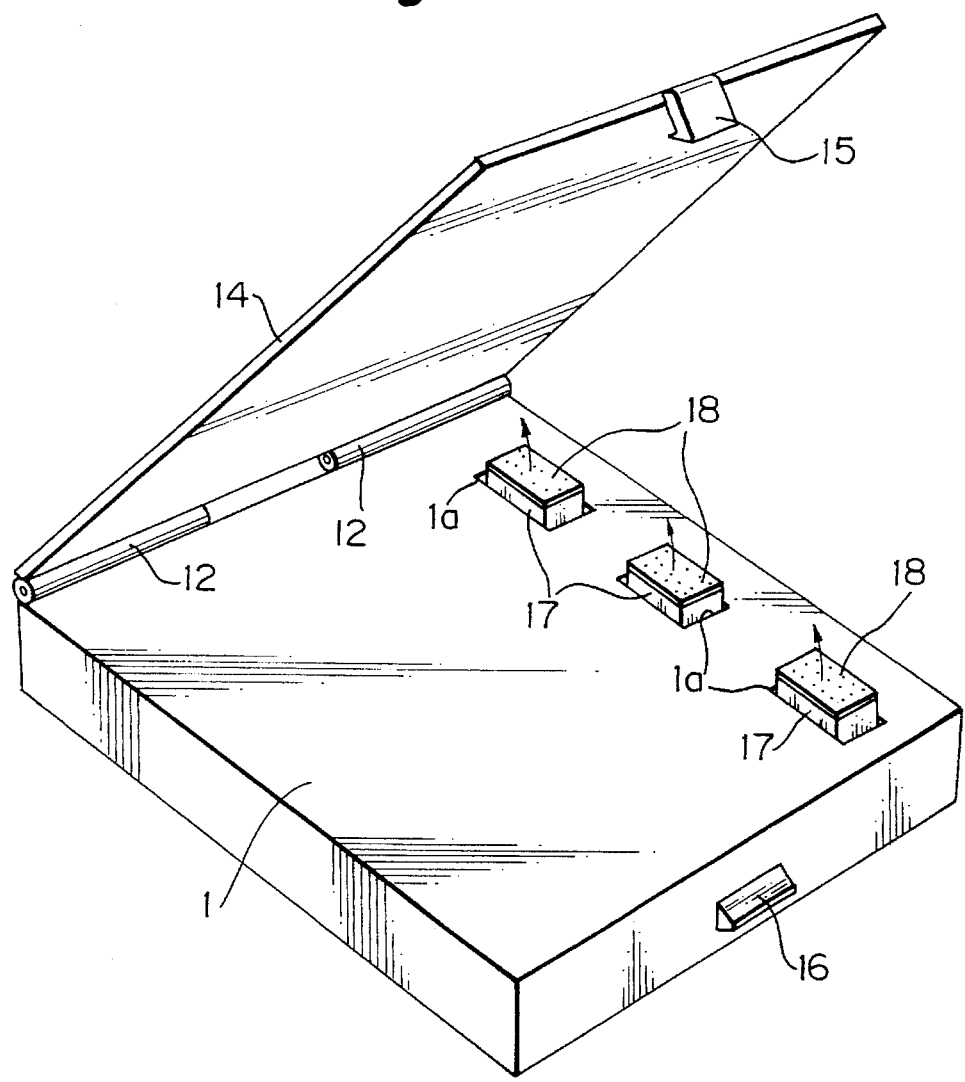
FIG. 11 is a perspective view of one of a pair of document tables included in the embodiment.

As shown in FIG. 1, a table unit 35 has a right and a left document table 1 at the center of the TPS. The tables 1 are each supported by a respective link mechanism 11 to be movable up and down. Each table 1 is constantly biased upward by a respective spring 13. As shown in FIG. 11, a presser plate 14 is rotatably connected to the rear end of each table 1 by hinges 12. A stop pawl 15 is provided at the free end of the cover plate 14 while a stop 16 is provided on the front end of the table 1. When the cover plate 14 is closed, the stop pawl 15 mates with the stop 16. This stop mechanism located on the front of the document table unit 35 facilitates the operation of the presser plate 14. A plurality of holes 1a are formed in the top of the table 1. Fixing members 17 each protrudes from one of the holes 1a. A rubber piece 19 is affixed to each fixing member 17 to allow the front or rear cover of the spread book BO to be surely fixed in place by the presser plate 14. The fixing members 17 are rotatably supported by a shaft 20 (FIG. 12) in the vicinity of the center of the TPS. Further, each fixing member 17 is constantly biased by a respective spring, not shown, in a direction indicated by an arrow in FIG. 11.

Figure 12:
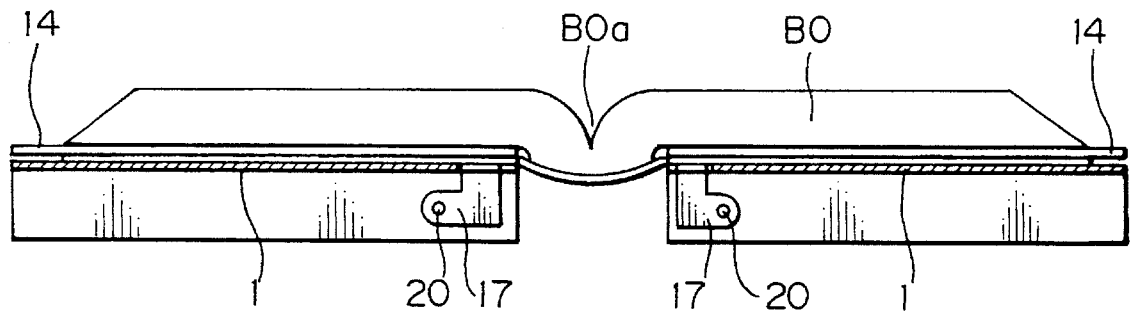
FIG. 12 is a side elevation showing the book set on the tables.

As shown in FIG. 12, the spread document BO has its front and rear covers held between the presser plates 14 and tables 1. Then, the presser plates 14 are locked to the respective tables 1, thereby surely fixing the book BO in place. At this instant, the fixing members 17 located in the vicinity of the center of the TPS sustain the opposite covers in the vicinity of the bound portion BOa, so that the document BO is more surely retained on the tables 1. When the presser plates 14 are locked to the associated tables 1 without the book BO intervening therebetween, a gap of several millimeters is defined between them. Hence, even a book having relatively thick front and rear covers can be fixed to the tables 1.

As shown in FIG. 1, the left table 1 is movable only in the up-and-down direction to prevent the book BO laid thereon from being displaced. On the other hand, the right table 1 is not only movable in the up-and-down direction, but also slidable in the right-and-left direction due to a slot 21. The right table 1 is constantly biased to the left by a spring 10. Slide shafts 22 are studded on the link mechanism assigned to the right table 1. The movement of the table 1 is stopped when one of the slide shafts 22 abuts against the adjoining end of the slot 21.

A selective table pressing and fixing mechanism and a table retracting mechanism included in the embodiment will be described hereinafter.

Each table 1 supported by the link mechanism 11 is constantly biased upward by the spring 13, as shown in FIG. 1. Hence, when the table unit 35 is set in the TPS (press mode), the spread pages of the book BO loaded on the tables 1 are pressed against the bottom of the scanning unit 200. Usually, the pressure from the book BO is received by the unit 200. However, when the unit 200 is positioned outside of the spread pages, the tables 1 and book BO protrude into the scanner unit 300 and prevent the unit 200 from moving smoothly. It is, therefore, necessary to fix the tables 1 at an adequate level and thereby prevent the tables 1 and book BO from protruding into the scanner unit 300 to an excessive degree. Further, when the unit 200 reads a document laid on the contact glass 206 via the exclusive optical path, the tables 1 must be retracted downward so as not to contact the bottom of the unit 200.

Figure 13:
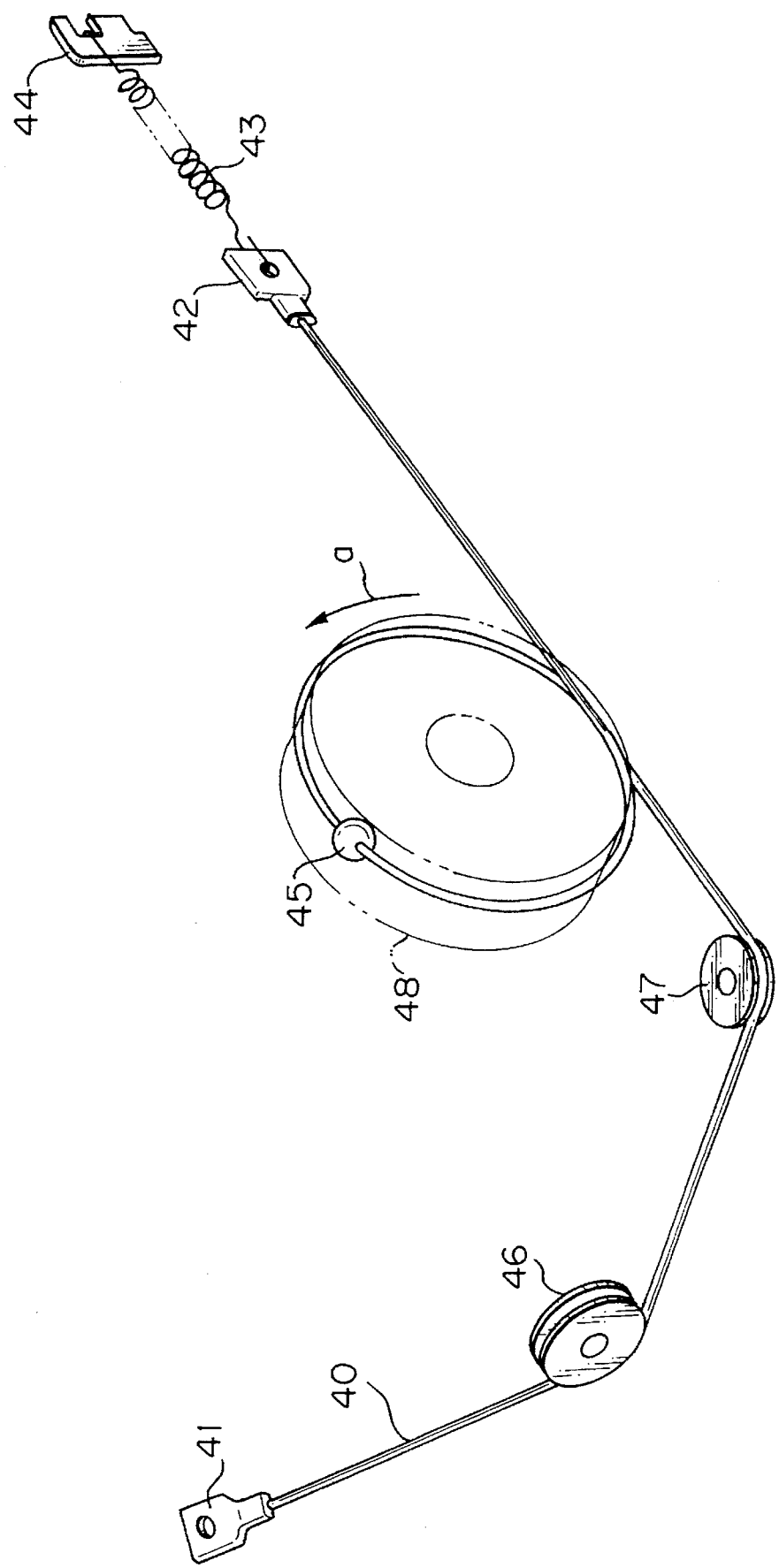
FIG. 13 is a perspective view of a mechanism for selectively pressing or fixing the document table.
Figure 14:
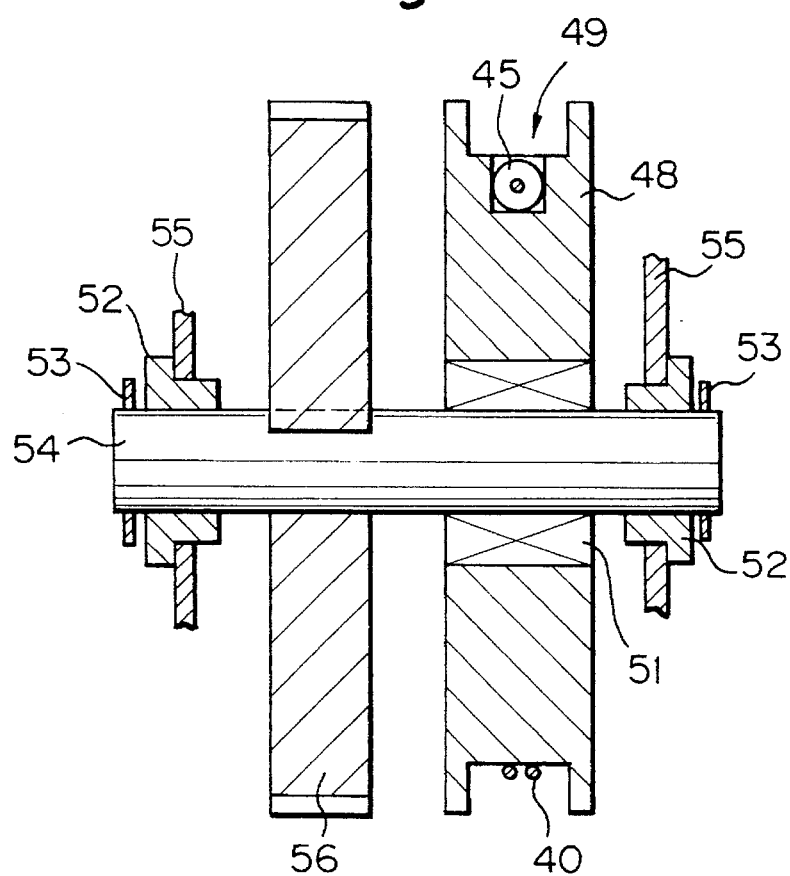
FIG. 14 is a section of the selective pressing and fixing mechanism.
Figure 15:
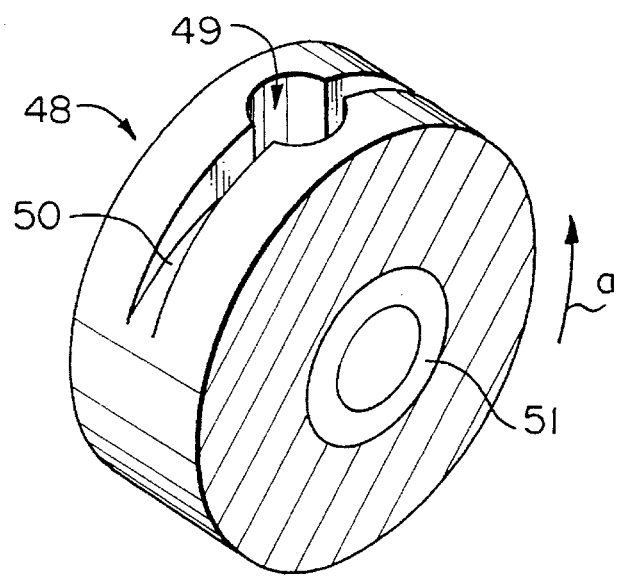
FIG. 15 is a fragmentary perspective view of the selective pressing and fixing mechanism.

A reference will be made to FIGS. 13–17 for describing a specific arrangement for selectively pressing the tables 1 against the scanning unit 200 or fixing them at an an adequate level, and a specific arrangement for retracting them downward. These arrangements are implemented as a single mechanism. As shown in FIG. 13, hooks 41 and 42 are fixed to the opposite ends of a control wire 40. A ball 45 is is also fixed to the control wire 40 at substantially the intermediate between the hooks 41 and 42. The hook 41 is fixed to the outer end of the link mechanism 11 which moves up and down together with the table 1. The control wire 40, extending from the hook 41, is redirected by pulleys 46 and 47 and wrapped around a control pulley 48. As shown in FIGS. 14 and 15, the pulley 48 is formed with a groove 50 and a hole 49 contiguous with the groove 50. The wire 40 is received in the groove 50 with the ball 45 thereof mating with the hole 49. In this configuration, the movement of the wire 40 is surely transformed to the rotary motion of the pulley 48. As shown in FIG. 13, a tension spring 43 is anchored at one end to the hook 42 and at the other end to a hook 44 which is fixed to a base 6 included in the table unit 35. Hence, the other end of the wire 40 is constantly pulled by the spring 43.

As shown in FIG. 14, the pulley 48 is supported by a shaft 54 via a one-way clutch 51. A pair of side plates 55 each supports a slide bearing 52. The shaft 54 is rotatably supported by the slide bearings 52 and stopped by E-rings 53. The pulley 48 is freely rotatable relative to the shaft 54 in a direction indicated by an arrow a. However, the pulley 48 is prevented from rotating in the other direction by the one-way clutch 51, but it is rotated integrally with the shaft 54. Hence, when the shaft 54 is fixed by a mechanism which will be described, the pulley 48 is rotatable only in the direction a of FIG. 13, i.e., in the direction for allowing the table 1 to be lowered.

Assume that while the shaft 54 is in a fixed state, the table 1 is lowered by some extraneous force, e.g., the weight of the book BO or the pressure attributable to the pages turned over. Then, the end of the wire 40 having the 1 hook 41 slackens because the hook 41 is fixed to the table 1. At the same time, the pulley 48 is pulled by the spring 43 and rotated in the direction a while absorbing the slack of the wire 40. As a result, the wire 40 is moved toward the hook 44 while maintaining the initial tension thereof. At this instant, the pulley 48 cannot rotate in the direction opposite to the direction a due to the one-way clutch 51. Hence, even when the tendency of the table 1 to rise exceeds the downward force acting on the table 1, the pulley 48 is prevented from rotating in the direction opposite to the direction a and is held in a halt at the rotated position. The pulley 48 held in a halt stops of the movement of the wire 40 which, in turn, stops the table 1 at the lowered position.

Figure 16:
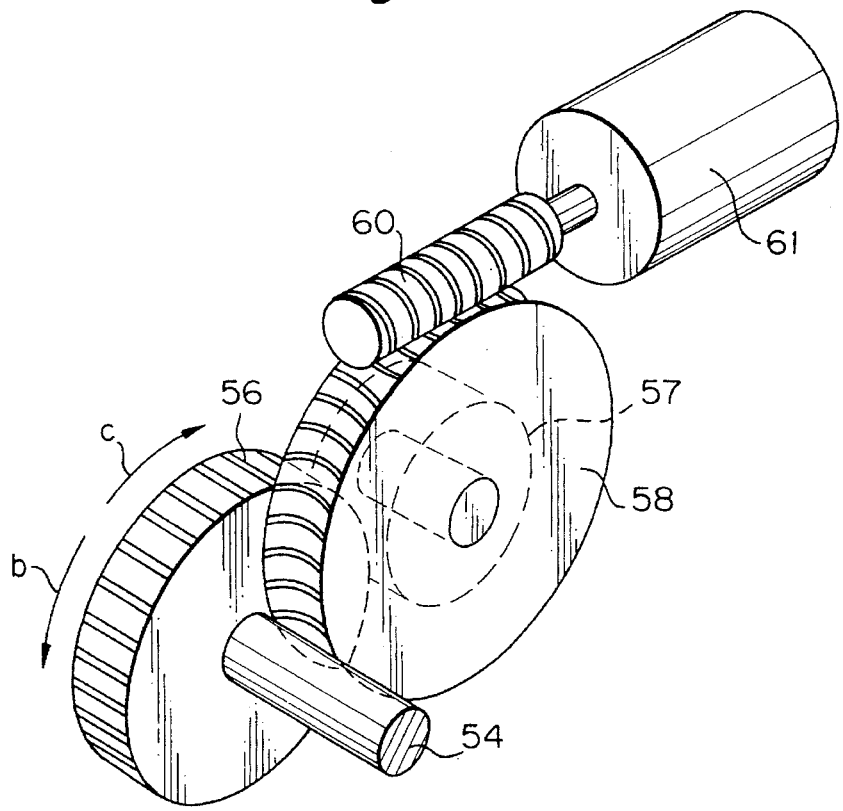
FIG. 16 is a perspective view of a section for driving the selective pressing and fixing mechanism.

The shaft 54 is fixed, as stated above, by the following table moving mechanism. As shown in FIG. 16, a gear 56 is fixed to the shaft 54 to be rotatable integrally therewith. A stud 59 is fixed to one side plate 55. The gear 56 is held in mesh with a gear 57 which is rotatably supported by the stud 59. A worm wheel 58 is formed integrally with the gear 57 and held in mesh with a worm gear 60 which is mounted on the output shaft of a motor 61. When the motor 61 is not energized, the worm wheel 58 is prevented from rotating due to the intermeshing worm gear 60 and worm wheel 58. As a result, the shaft 54 connected to the worm wheel 58 via the gear 57 is held in a halt.

Figure 17:
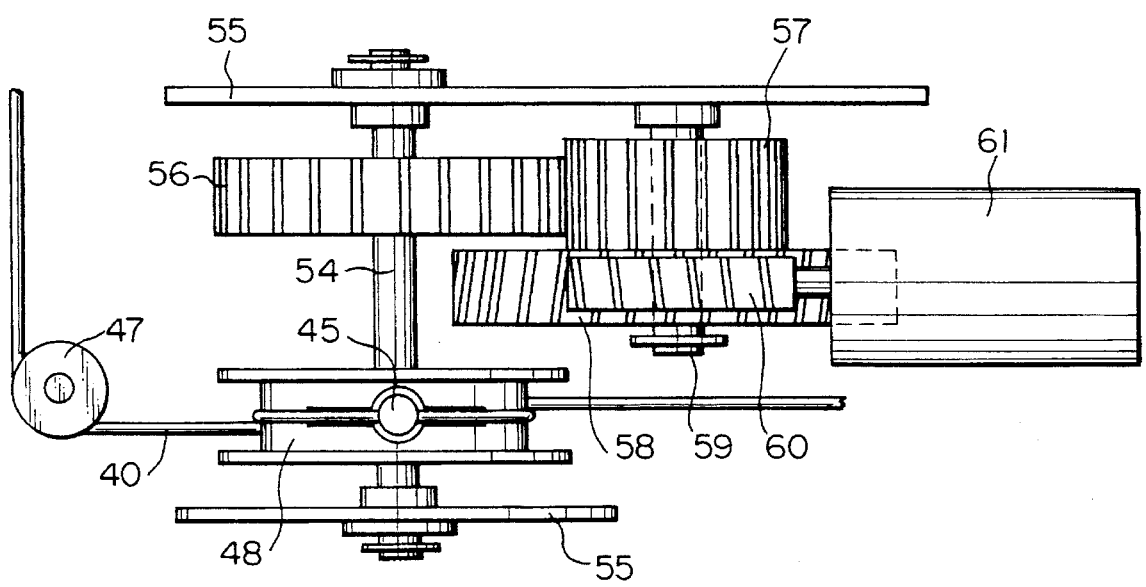
FIG. 17 is a plan view of the selective pressing and fixing mechanism.
Figure 18:
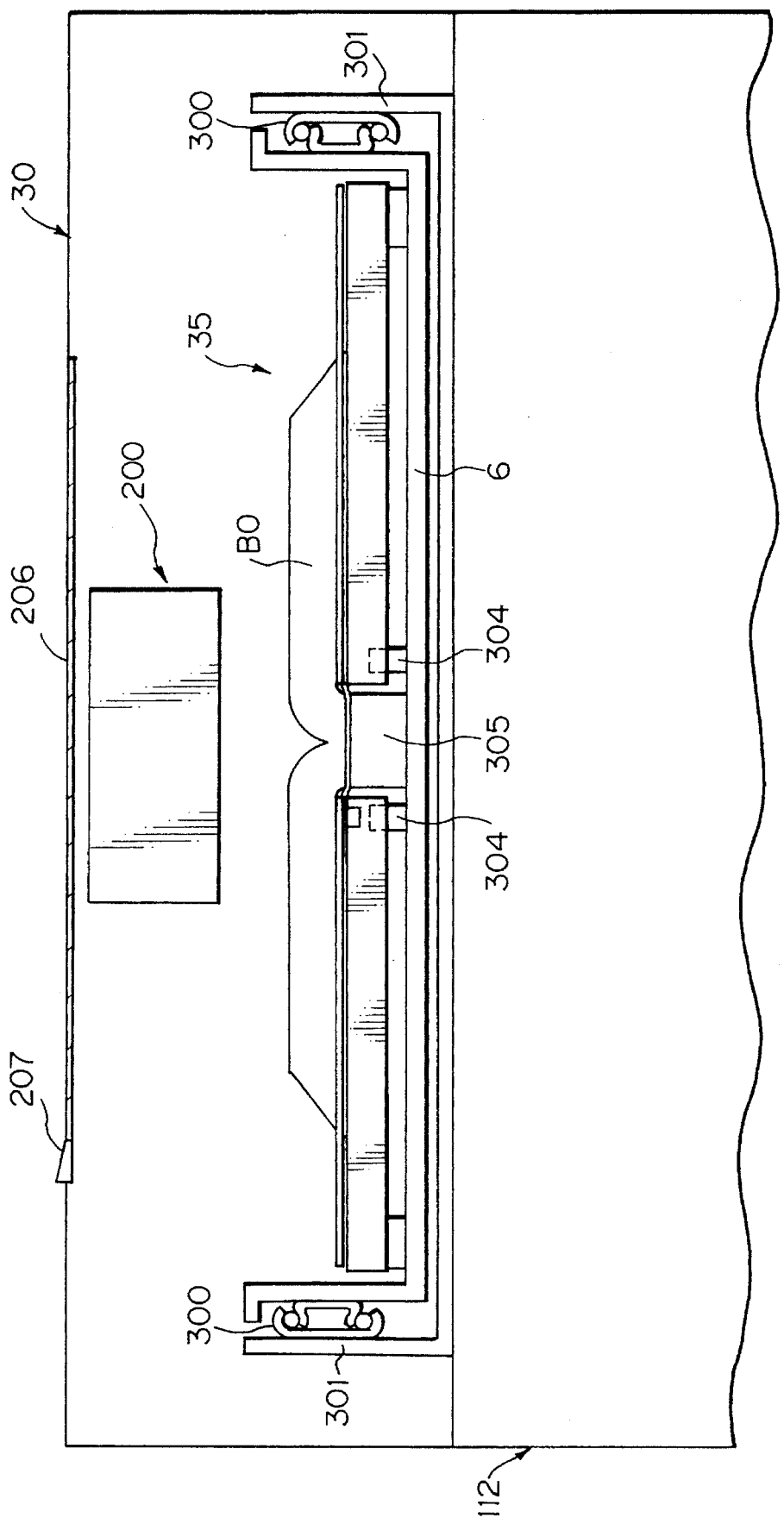
FIG. 18 is a side elevation showing the tables lowered to their retracted position.

How the table 1 is lowered to a retracted position is as follows. In FIGS. 16 and 17, when the motor 61 is rotated in a direction for rotating the gear 56 in a direction b, the pulley 48 is caused to rotate integrally with the shaft 54 via the one-way clutch 51. As the pulley 48 rotates in the direction a in FIG. 15, the wire 40 moves to the side where the hook 44 is positioned. Consequently, the right and left tables 1 are lowered in FIGS. 1 and 19 and then brought to a stop as soon as they are sensed by respective sensors 304. As shown in FIG. 18, in the lowered or retracted position, the top of each table 1, i.e., the top of the spread book BO is spaced apart from the scanning unit 200.

To raise the tables 1, the motor 61 is rotated in the other direction for rotating the gear 56 in a direction c, as shown in FIGS. 16 and 17. Then, the shaft 54 is rotated in the opposite direction to the direction a in FIG. 15. As a result, the pulley 48 is rendered freely rotatable relative to the shaft 54 due to the one-way clutch 51. In the illustrative embodiment, the torsion springs 13, biasing the tables 1 upward, each exerts a force more intense than the force pulling the wire 40 downward. Hence, when the pulley 48 is freely rotatable in the opposite direction to the direction a, the wire 40 is moved to the side where the hook 41 is positioned due to the action of the associated spring 13. This raises the tables 1 in FIG. 1 and thereby urges the spread pages of the book BO against the scanning unit 200. When the motor 61 is continuously driven, the shaft 54 is rendered freely rotatable relative to the pulley 48 via the one-way clutch 51. In this condition, the spread pages of the book BO are continuously pressed against the unit 200. This operation is effected only when the unit 200 is positioned above the tables 1, as will be described specifically later.

Figure 19:
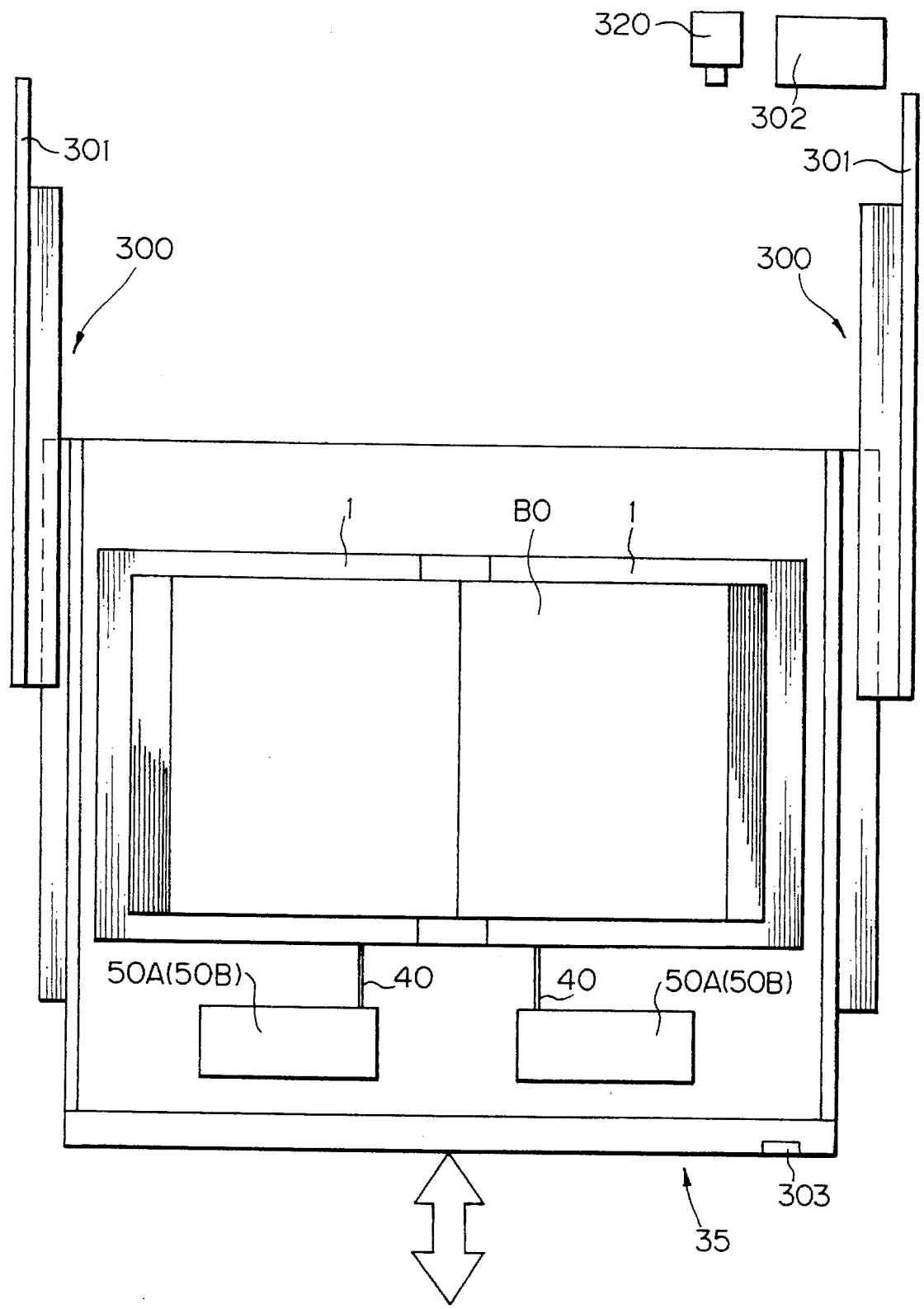
FIG. 19 is a plan view of a table unit supporting the tables and pulled out of the body of the device.

As shown in FIGS. 1 and 19, the selective table pressing and fixing device and table retracting device described above and labeled 50A and 50B, respectively, are assigned to each of the two tables 1. The devices 50A and 50B assigned to one table 1 are controlled independently of the devices 50A and 50B assigned to the other table 1 in association with the position of the scanning unit 200. Specifically, two motors 61 are each drivably connected to the respective devices 50A and 50B and controlled independently of each other by the TPS control board 110 via respective motor drivers 121.

Figure 20:
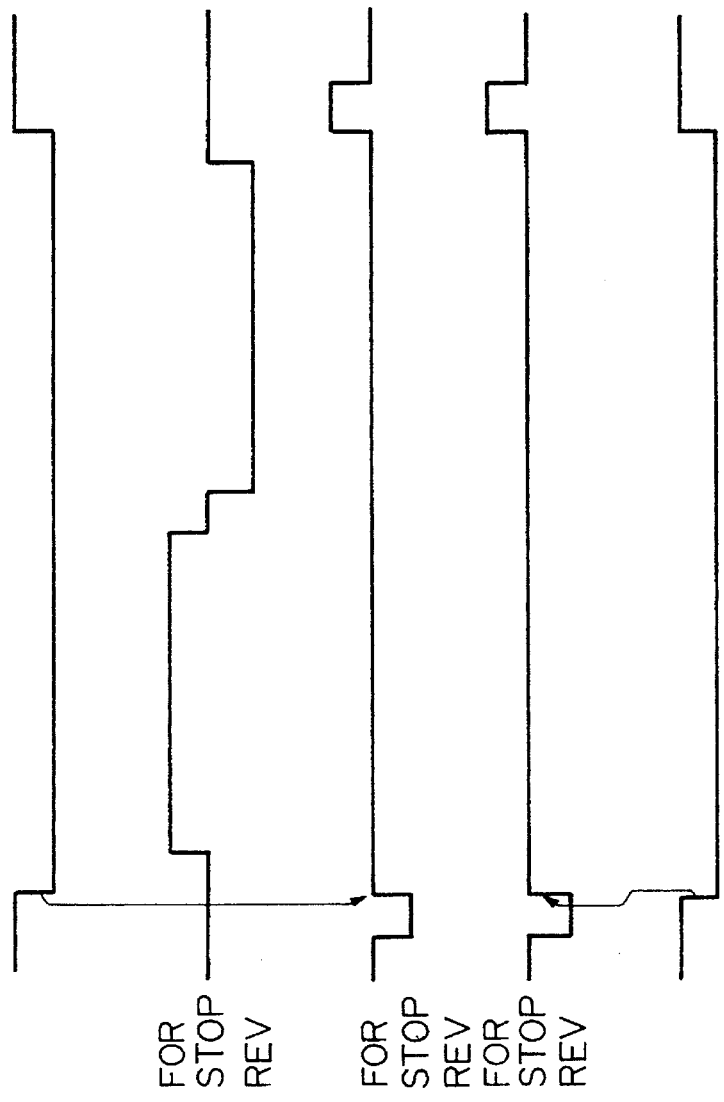
FIG. 20 is a timing chart demonstrating the retraction of the tables.

The procedure for retracting the tables 1 downward (retract mode) is shown in FIG. 18. FIG. 20 is a timing chart demonstrating this procedure specifically. As shown in FIG. 20, before the scanning unit 200 starts moving, the motors 61 are reversed to lower the tables 1 until the sensors 304 sense the associated tables 1. Then, the scanner motor 106 is energized to move the unit 200 in a predetermined scanning direction. This is repeated a desired number of times. At the end of the retract mode, the unit 200 is returned to the center home position, and the motors 61 are rotated a predetermined number of times forward to return the associated tables 1 to their original position.

On the other hand, when the unit 200 reads a document laid on the contact glass 206, the edge of the scale 207 defines a reference position. The reference position is different from the position for starting reading the book BO, so that the construction is provided with a minimum size. This maintains the read start point constant and thereby simplifies the control. In a sheet mode for reading a document laid on the contact glass 206, the tables 1 are lowered to their retracted position. Then, the unit 200 is moved to the left from the center home position. As soon as the end HP sensor 115 senses the unit 200 at the end home position (see FIG. 21), the unit 200 is brought to a stop. In this condition, the operator enters desired reading conditions and then presses a start button. In response, the scanner motor 106 is energized to move the unit 200 to the right, as viewed in FIG. 1, thereby reading the document on the contact glass 206.

A table press and fix mode will be described hereinafter. At the end of operation of the TPS, the unit 200 returns to the center home position shown in FIG. 1. Hence, the unit 200 is also located at the center home position when the book BO is set on the TPS. This is because the center of the TPS is used as a reference when the book BO is set. Specifically, when the tables 1 are raised after the table unit 35 has been slid and closed, the book BO will be surely pressed against the unit 200 without regard to the size thereof. At the beginning of this mode, whether or not the unit 200 is present at the center home position is again determined on the basis of the output of the center HP sensor 114. In response to a start signal from the operation and display control 111, the unit 200 is moved to the left from the center home position and then stopped at the end home position (FIG. 21) where the end HP sensor 115 is located.

Figure 26:
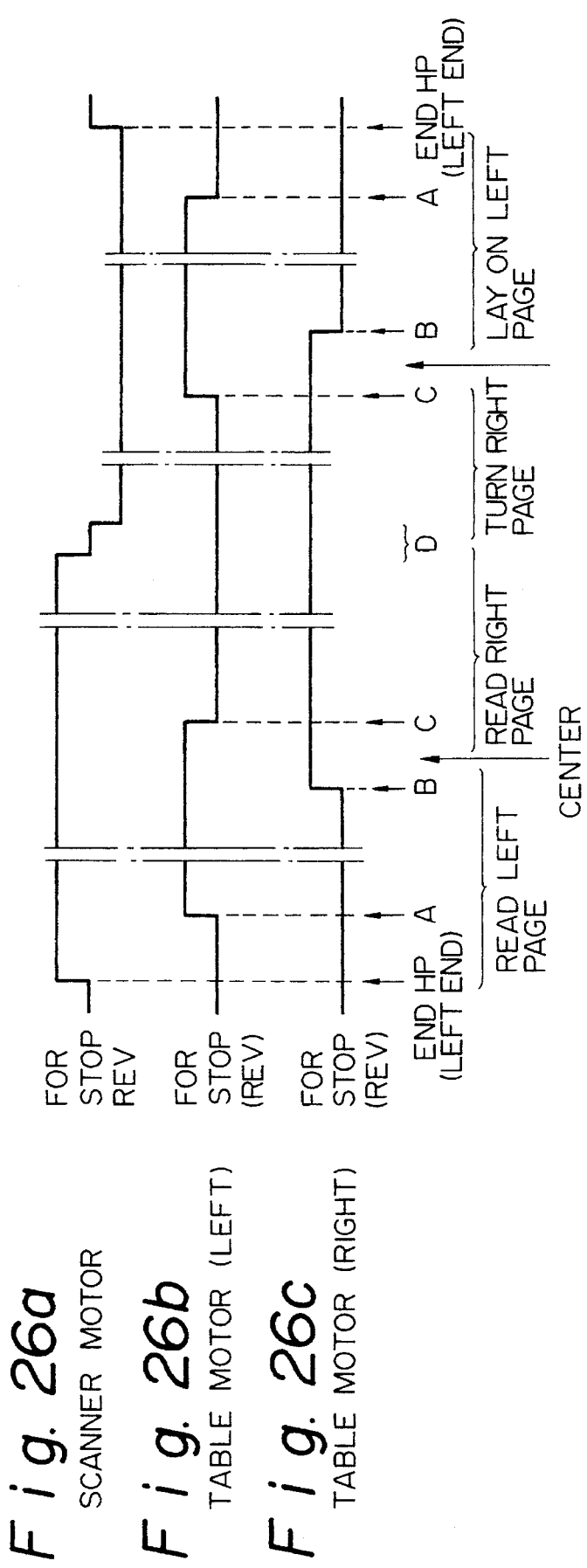
FIG. 26 is a timing chart indicative of the operations of motors to occur in the press and fix mode.

FIGS. 21-25 demonstrate the movement of the unit 200 to occur in the table press and fix mode. FIG. 26 is a timing chart associated with FIGS. 21-25. The end home position of the unit 200 (FIG. 21)is the point where the reading and page turning operation begins and ends. At this position, the unit 200 does not overly the tables 1. The two motors 61 are in a halt and maintain the tables 1 in a fixed state.

Figure 21:
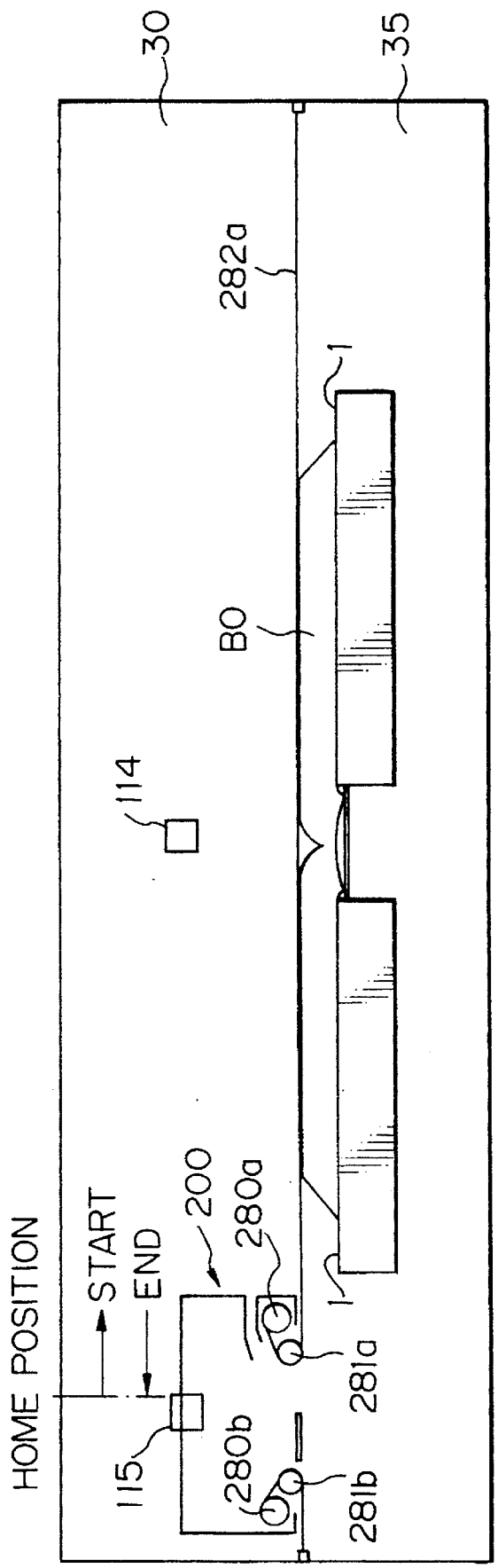
FIGS. 21–25 are views demonstrating the movement of the scanning unit to occur in a press and fix mode available with the embodiment.

First, the scanner motor 106 is rotated forward to move the unit 200 to the right, as viewed in FIG. 21. When a right press roller 281a, included in the unit 200, arrives at the left edge of the spread book BO (point A, FIG. 22), the left motor 61 is rotated forward to bring the left table 1 into a pressing state. As a result, the left page of the book BO is pressed against the unit 200 and read in an optimal manner. Slightly before the unit 200 arrives at the center point of the book BO (FIG. 23), the right press roller 281 arrives at the left edge of the right table 1 (point B, FIG. 26). Then, the right motor 61 is rotated forward to bring the right table 1 into a pressing state. The unit 200 starts reading the right page via the center point of the book BO. Subsequently, a left press roller 281b arrives at the right edge of the left table (point C, FIG. 26). Then, the left motor 61 is deenergized in order to fix the left table 1 at the current level. As a result, the left page of the book BO is fixed in place by a press sheet 282b and prevented from protruding into the scanner unit 30. The left page waits, at the same level, until the unit 200 arrives it again.

Figure 24:
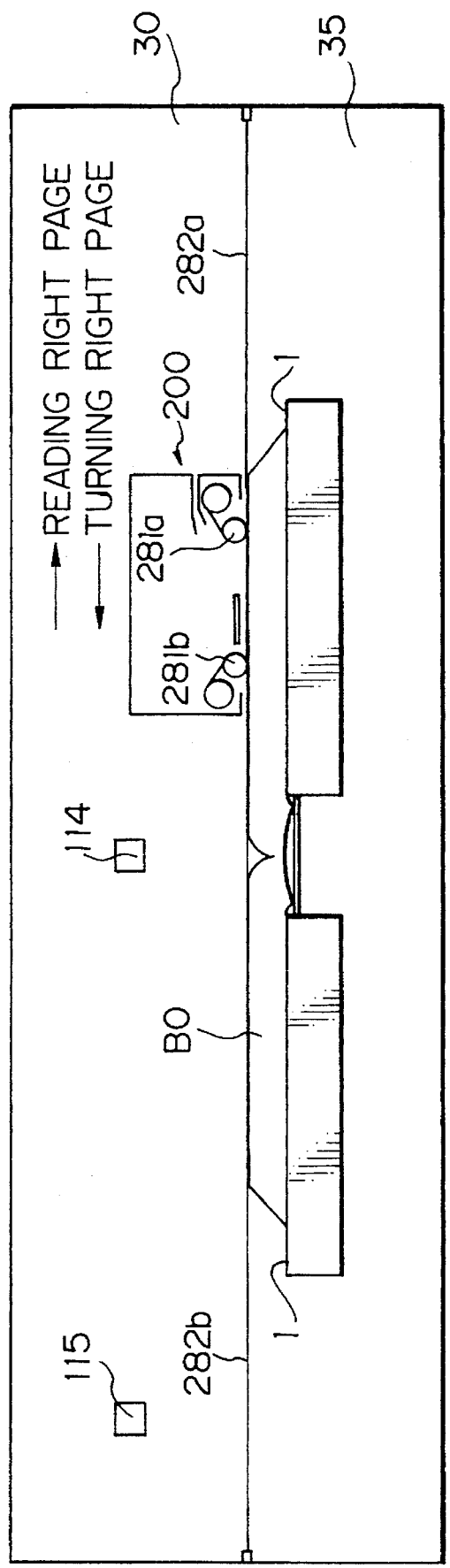
Figure 25:
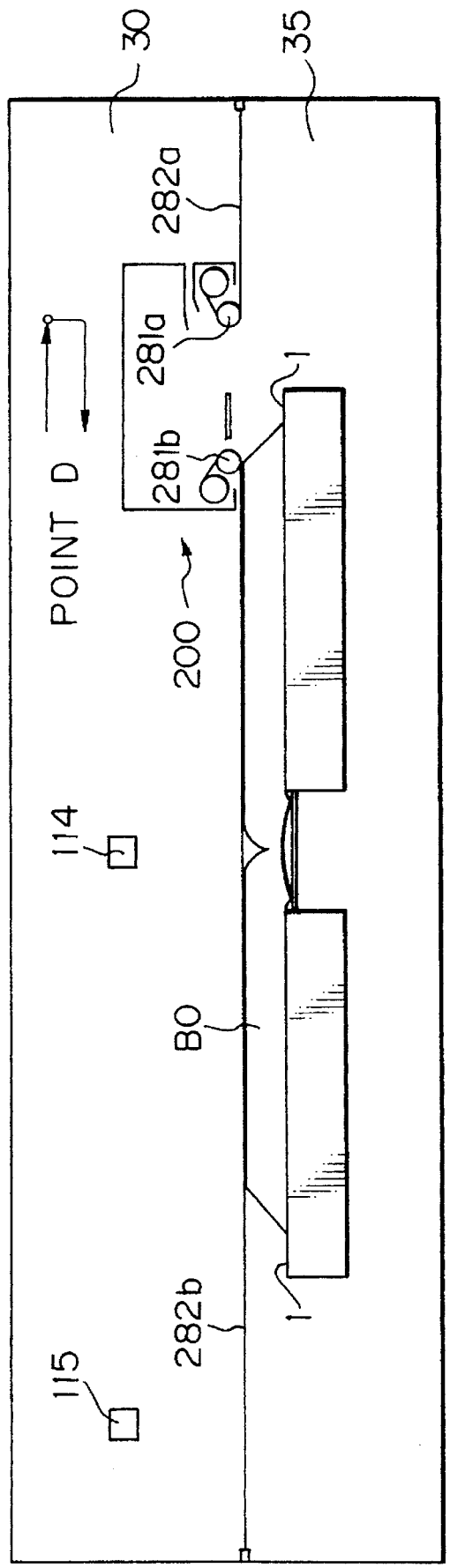

FIG. 24 shows how the unit 200 reads the right page or turns it over while in movement. As shown, the unit 200, fully read the right page, is brought to a stop when the left press roller 281b reaches the right edge of the right table 1 (point D, FIG. 25). Then, the scanner motor 106 is reversed to move the unit 200 to the left. The unit 200 moves to the left while lifting the right page or leaf. Slightly before the unit 200 arrives at the center point (FIG. 23), the left press roller 281b reaches the right edge of the left table 11 (point C). At this time, the left motor 61 is rotated forward to bring the left table 61 into the pressing state.

Subsequently, the unit 200 moves away from the center point and starts laying the lifted right leaf on the left page. Then, the right press roller 281a arrives at the left edge of the right table 1 (point B). At this instant, the right motor 61 is deenergized to fix the right table 1 at the current level. In this condition, the right page is pressed by a press sheet 282a and prevented from protruding into the scanner unit 30. The right page waits, at the same level, until the unit 200 arrives again.

Figure 22:
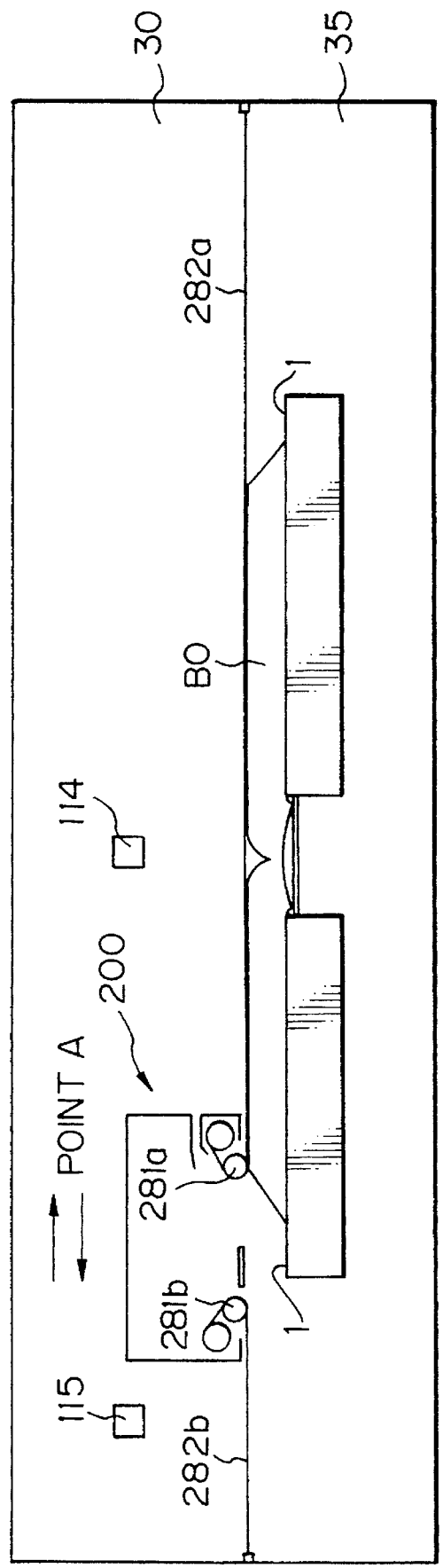
Figure 23:
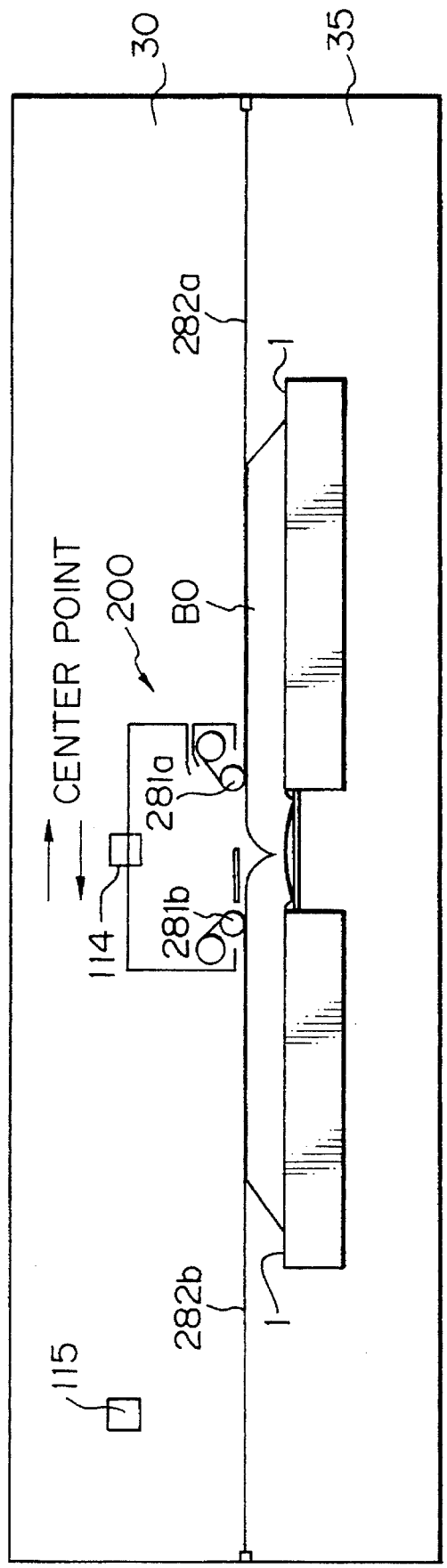

After the unit 200 has fully laid the right page on the left page, the right press roller 281a arrives at the left edge of the left table 1 (point A, FIG. 22). Then, the left motor 61 is deenergized to fix the left table 1. As a result, the book BO is fixed in place and prevented from protruding into the scanner unit 30. The unit 200 is brought to a stop on reaching the end home position (FIG. 21).

A mechanism for allowing the table unit 35 to be pulled out of the scanner unit 30 will be described. As shown in FIGS. 1 and 18, slide rails 300 are mounted on the right and left sides of the table unit 35. The rails 300 are respectively engaged with rail brackets 301 disposed in the scanner unit 30 in such a manner as to be slidable in the front-and-rear direction of the TPS housing. So long as the table unit 35 is received or set in the scanner unit 30, a lock device 302 shown in FIG. 19 locks the unit 35 unless a special command is generated. Therefore, the operator is inhibited from pulling out the table unit 35. This condition is constantly sensed by a lock sensor 320. The slide rails 300 are extendable to such a degree that the tables 1 are sufficiently pulled out toward the operator via the front end of the TPS housing. Provided on the front end of the table unit 35 are an open/close switch 303 and a knob, not shown, for pulling out the tables 1.

The book BO is set in the scanner unit 30, as follows. On confirming a book mode on the operation and display control 111, the operator presses the open/close switch 303. If the book mode is not set up, the operator presses a book mode switch, not shown, provided on the control 111. In any case, whether or not the tables 1 are in their lowered or retracted position is determined. If the answer is negative, the tables are lowered; if otherwise, whether or not the scanning unit 200 is located at the center home position is determined. If the unit 200 is absent at the center home position, it is moved to the center home position. When the unit 200 is positioned at the center home position, the lock device 302 is deactivated to unlock the table unit 35. At this time, the condition that the table unit 35 can be pulled out is displayed on the operation and display control 111.

On confirming the above condition, the operator holds the knob of the table unit 35, pulls out the unit 35, releases the stop pawls 15 of the right and left presser plates 14, and then opens the plates 14 upward (FIG. 11). Subsequently, the operator positions the front and rear covers of the book BO on the table 1 by using the front edges of the tables 1 as a reference. Then, the operator closes the presser plates 14 downward. As a result, the front and rear covers are respectively sandwiched between the presser plates 14 and the tables 1. Thereafter, the operator engages the stop pawls 15 with the stops 16 (FIG. 12). In this condition, the operator opens the page which should be read first, and then pushes the table unit 35 into the scanner unit 30 while pressing the bound portion with one hand. When the table unit 35 is so set in the scanner unit 30, the lock sensor 320 senses it. In response, the lock device 302 locks the table unit 35 in a predetermined position within the TPS housing. Finally, the motors 61 are energized to raise the tables 1 until the spread book BO has been set at a predetermined reading position.

Figure 27:
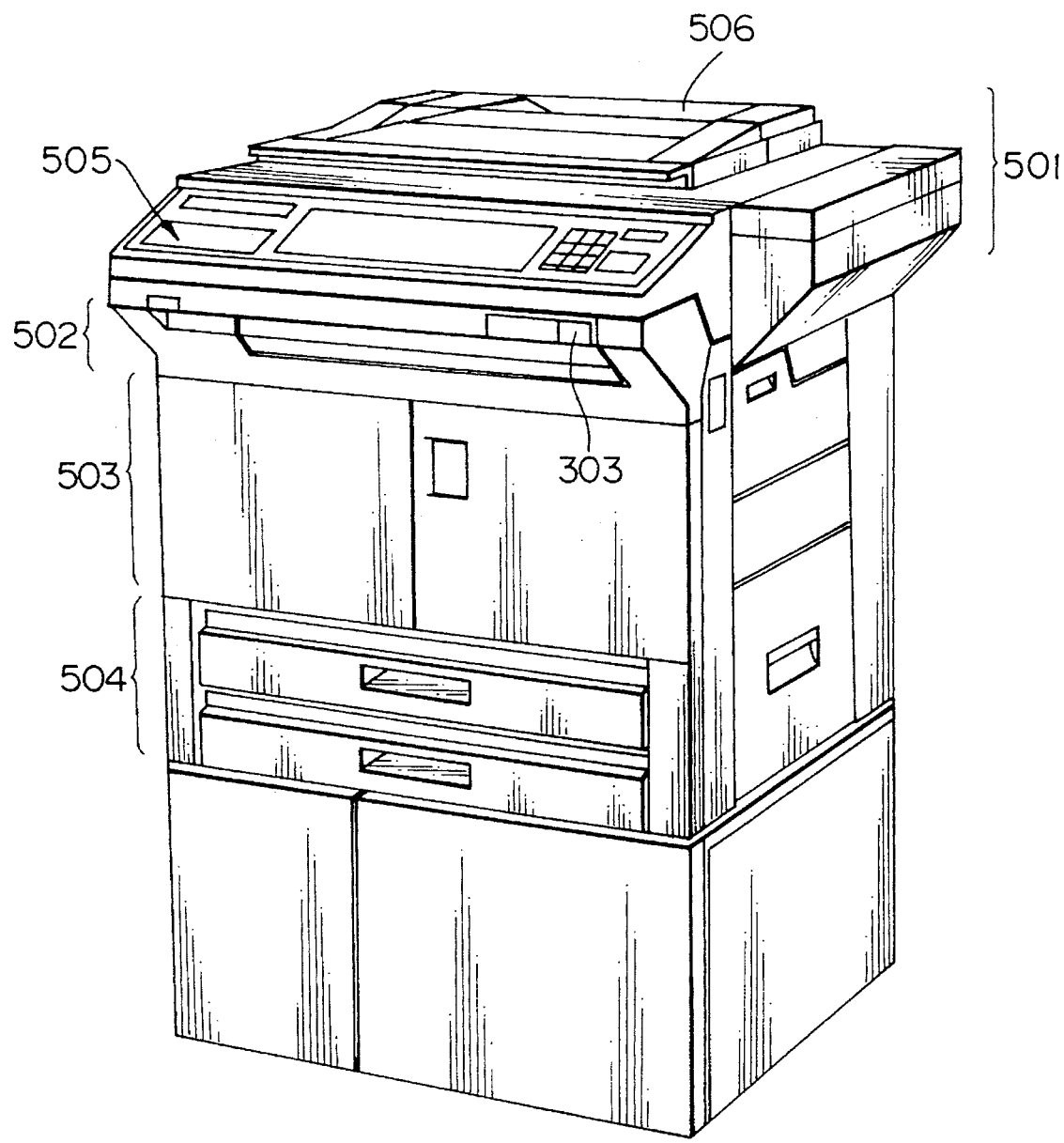
FIG. 27 is a perspective view of an image forming apparatus on which the embodiment is mounted.
Figure 28:
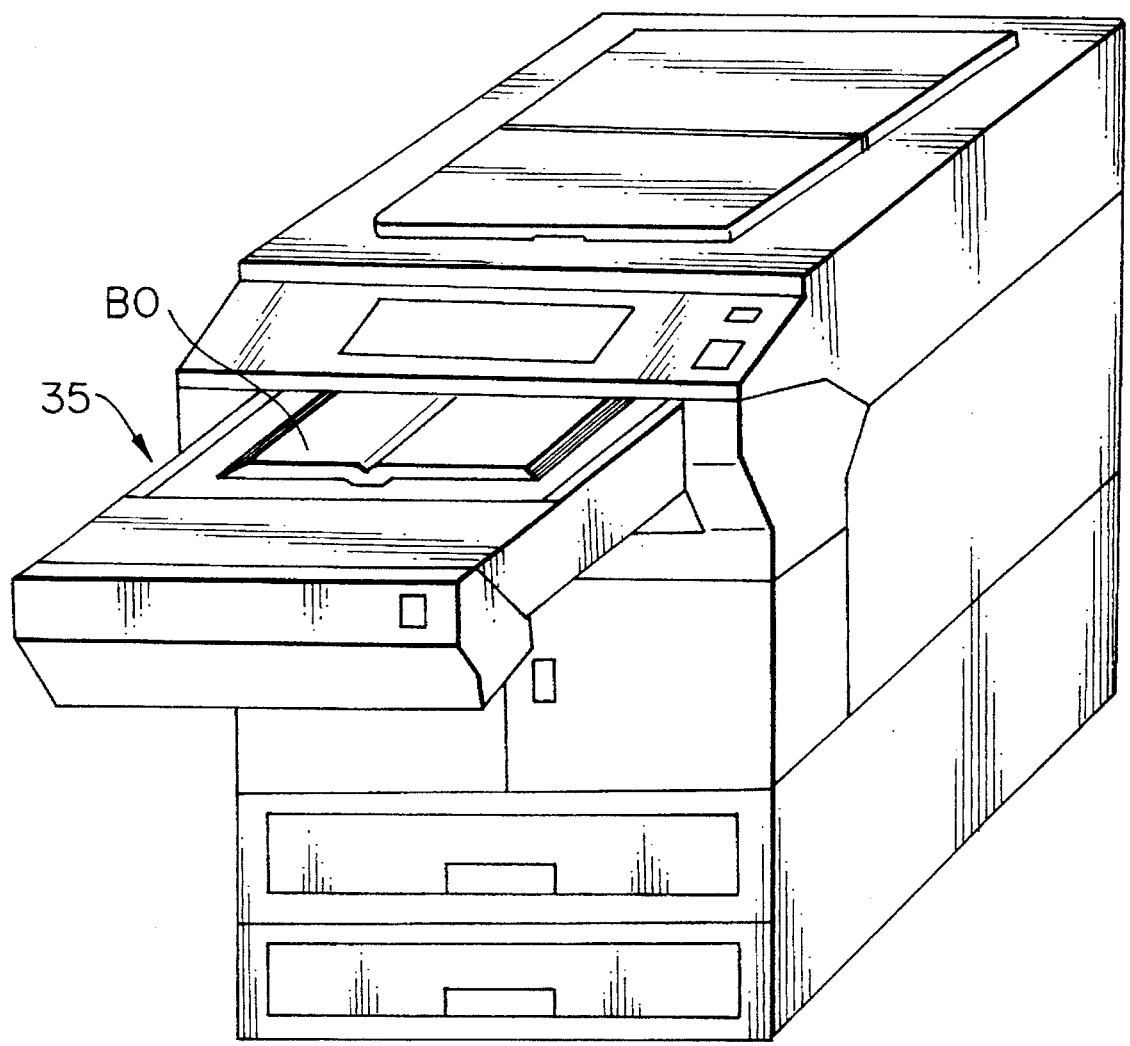
FIG. 28 is a perspective view of the table unit pulled out of the housing of the image forming apparatus shown in FIG. 27.
Figure 29:
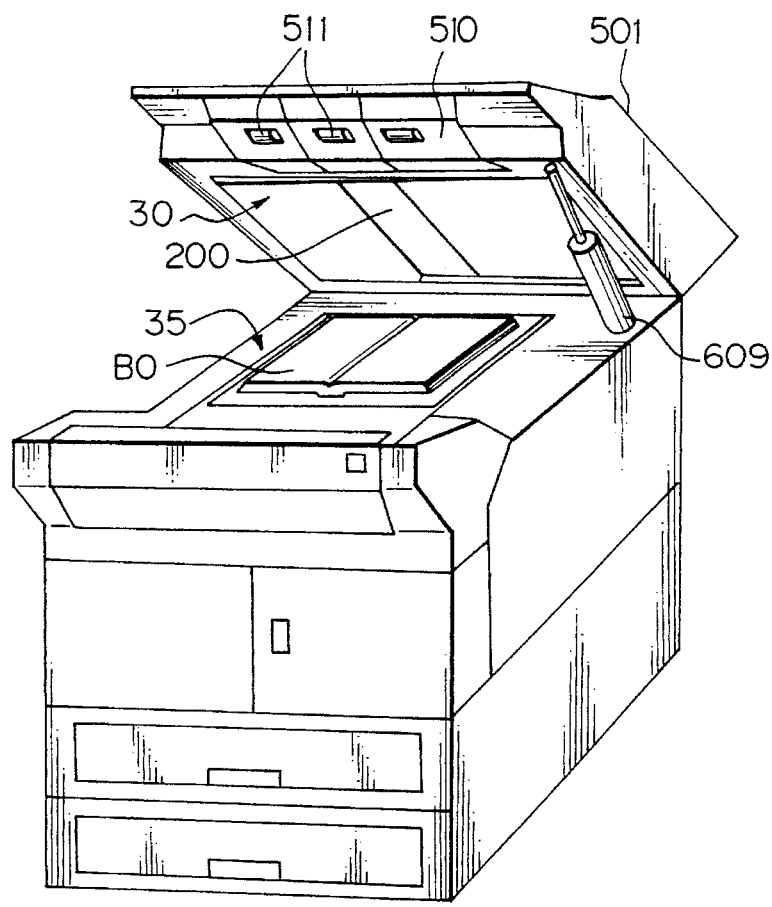
FIG. 29 is a perspective view showing a scanner section opened away from the housing of the image forming apparatus.

FIG. 27 shows a specific configuration of a printer, copier or similar image forming apparatus including the TPS described above. As shown, the apparatus has a scanner section 501, a document table section 502, a printer section 503, a paper feed section 504, an operating section 505, and a cover plate 506 for pressing a document. As shown in FIG. 28, to load and unload the book BO, the table unit 35 included in the document table section 502 is pulled out of the apparatus housing. Further, the scanner section 501 is openable a way from the top of the apparatus housing. As shown in FIG. 29, when the scanner section 501 is opened, the scanning unit 200 of the scanner unit 30 and the spread pages of the book BO are accessible for jam removal, maintenance or similar purpose. The scanner section 501 and apparatus housing (printer section 503) are connected by a gas spring 609. The gas spring 609 maintains the scanner section 501 in the open position, as shown in FIG. 29.

Figure 30:
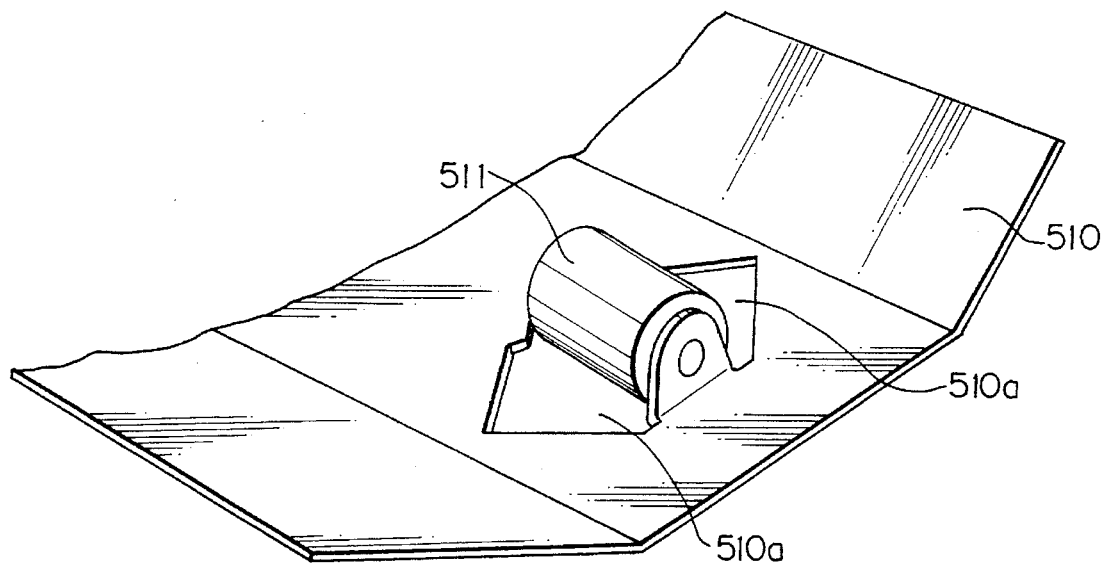
FIG. 30 is a perspective view of a guide plate provided in front part of the bottom of the scanner section.

A guide plate 510 is mounted on the scanner section 501 in front of the scanner unit 30. When the spread book BO is inserted into the scanner unit 30, the guide plate 510 prevents the book BO from being damaged by guiding it at a predetermined level. As shown in FIG. 30, guide rollers 511 are rollably mounted on the lowermost surface of the guide plate 510. The rollers 511 roll in the same direction as the table unit 35 being pulled out of or pushed into the scanner unit 30. The bottom of each guide roller 511 protrudes from the underside of the plate 51. As shown in FIG. 30, the plate 510 is formed with notches 510a in portions thereof where the rollers 511 are located. Each notch 510a is angled in the front-and-rear direction.

As shown in FIG. 32, the lowermost surface of the guide plate 510 is lower in level than the bottom of the scanning unit 200 by a predetermined amount G. The guide surfaces extending from the lowermost surface in the front-and rear direction are each bent obliquely upward. Hence, even when the edges of the spread pages are slightly curled upward, the table unit 35 can be smoothly pulled out of or pushed into the scanner unit 30 by having the curled pages pressed by the guide surfaces of the plate 510.

Figure 31B:
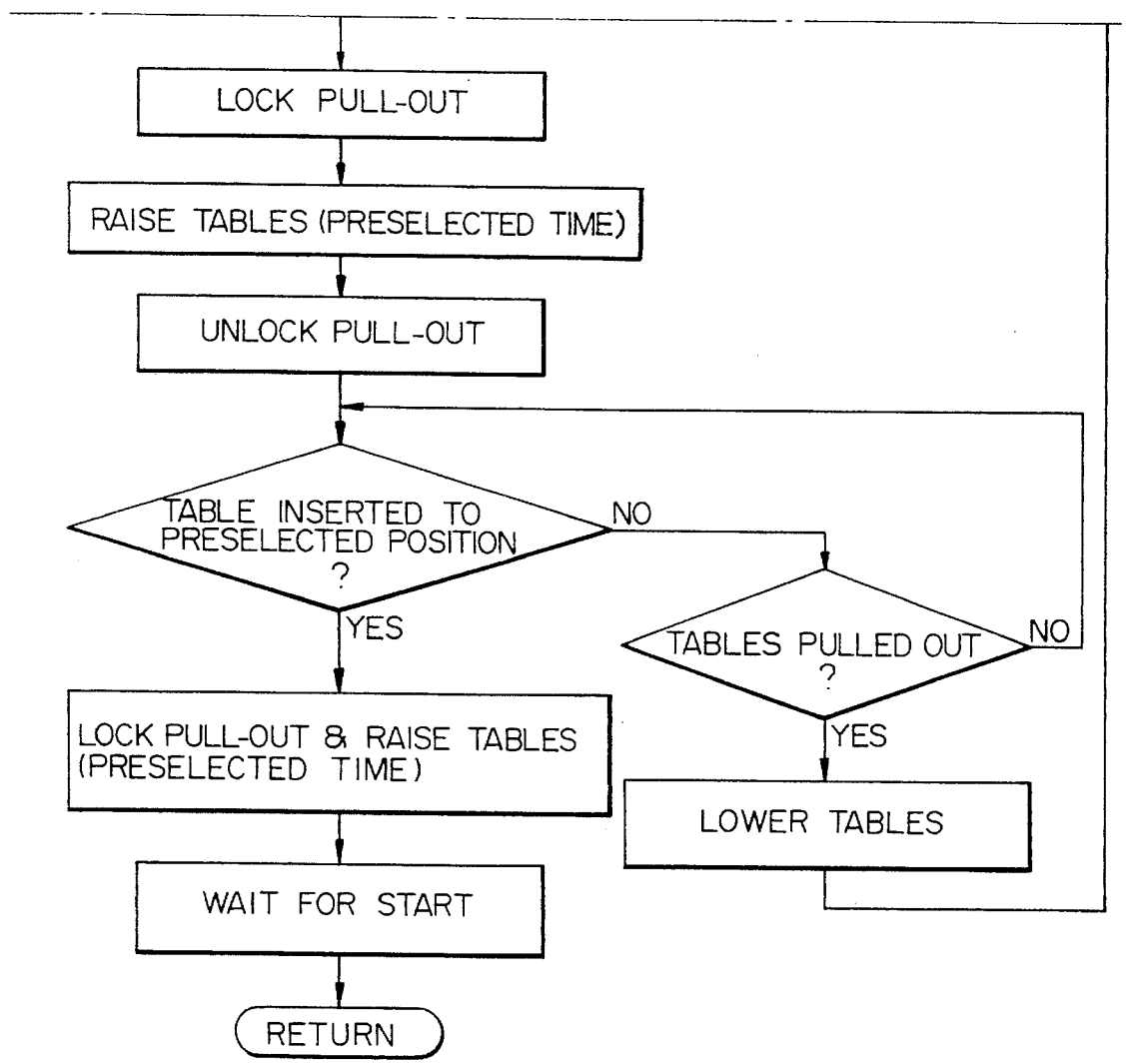
FIG. 31 is a flowchart demonstrating a control surboutine to be executed when a book is set in the image forming apparatus.
Figure 33:
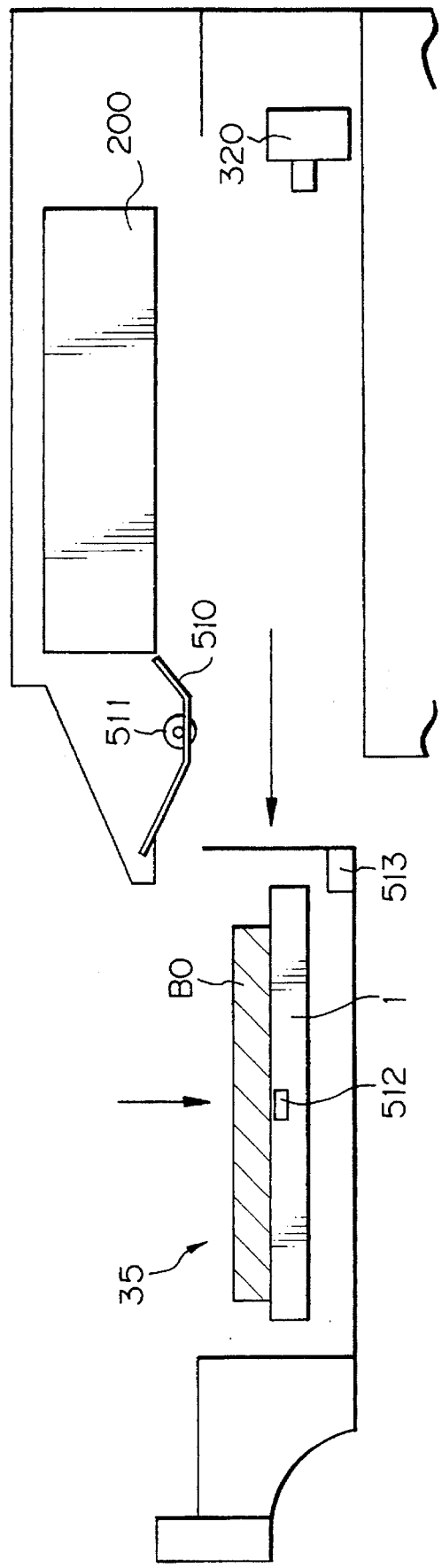
Figure 34:
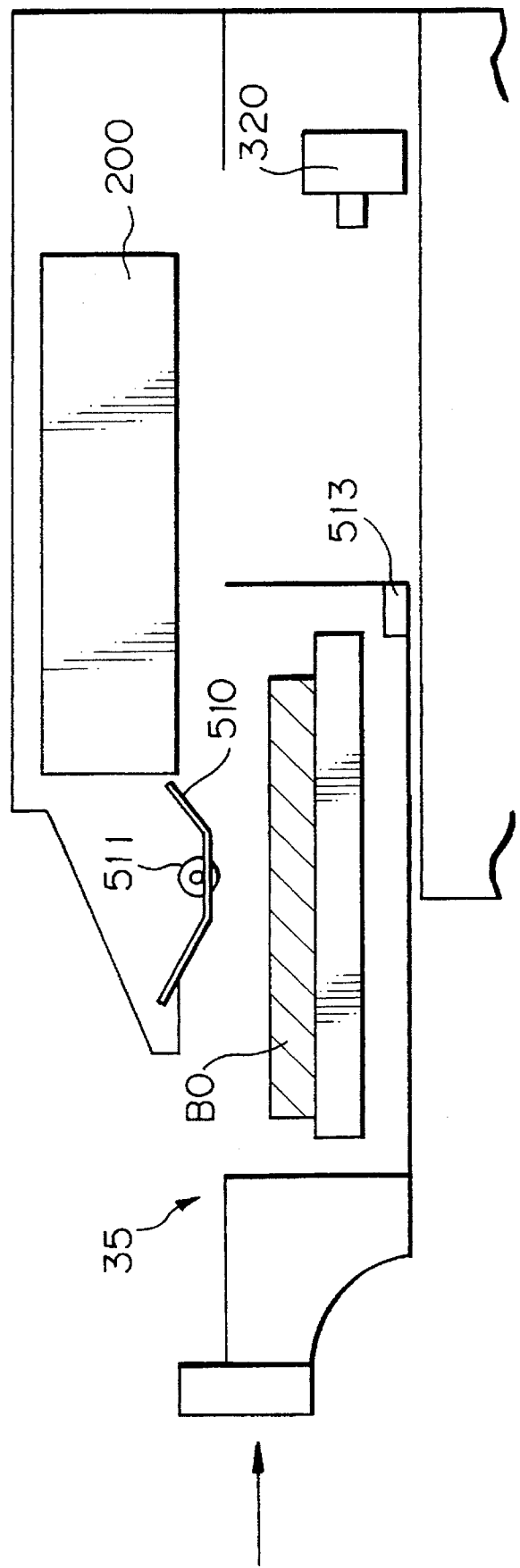

FIG. 31 is a flowchart demonstrating a control subroutine to be executed when the document BO is set in the scanner unit 30. FIGS. 32–37 show the movement of the table unit 35. As shown in FIG. 31, a book mode is set up when a book copy button 507 (FIG. 28) is pressed. Then, the tables 1 are lowered, as shown in FIG. 32. When the right and left lower limit sensors 304 sense the associated tables 1, the tables 1 are stopped, and the lock device 302 unlocks the tables 1. Subsequently, the operator pulls out the table unit 35 from the apparatus housing, as shown in FIG. 33. At this instant, the lock sensor 320 senses the pull-out of the table unit 35. Then, the operator sets the book BO on the tables 1 in a spread position. The document sensor 512 senses the document BO on the tables 1. In this condition, the operator opens the page which should be read or copied first, and then inserts the table unit 35 into the housing. As the table unit 35 reaches an intermediate point in the housing, a draw lock device 513 locks the drawing and inserting operation of the table unit 35. For or example, the draw lock device 513 turns on or turns off a solenoid and thereby moves a pin studded on the table unit 35 into or out of the casing. As a result, the drawing and inserting operation is locked or unlocked.

Figure 35:
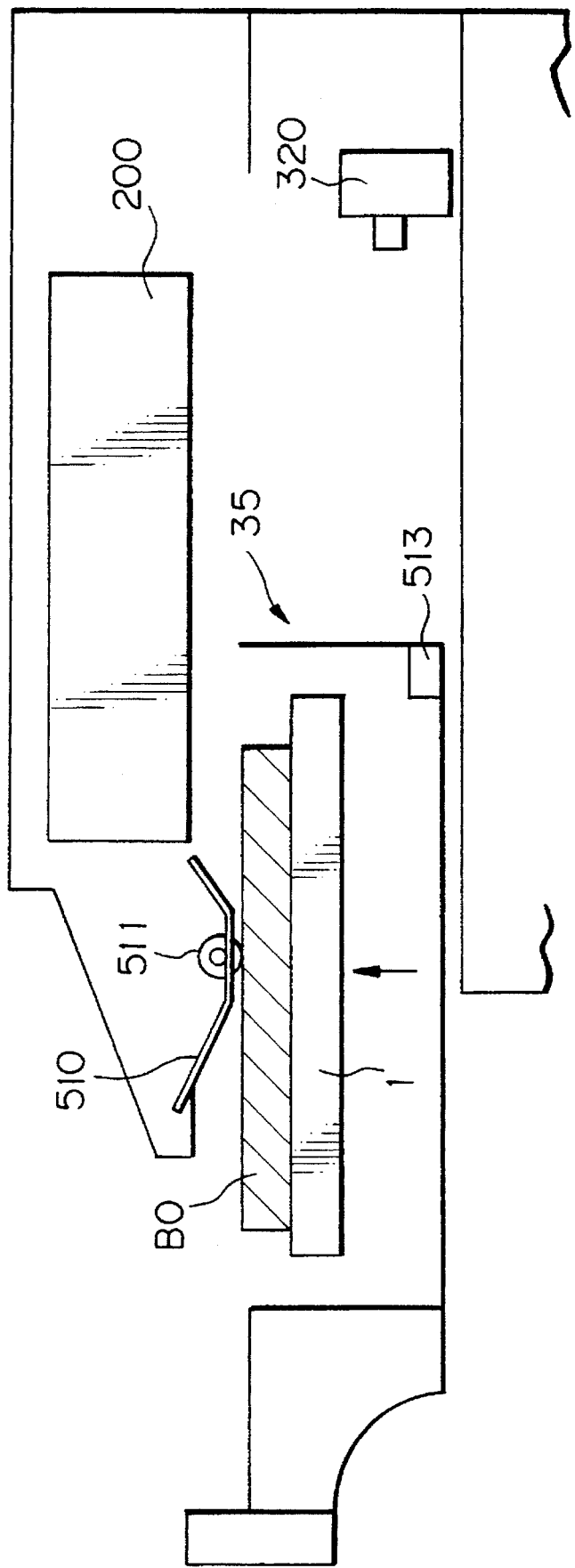
Figure 36:
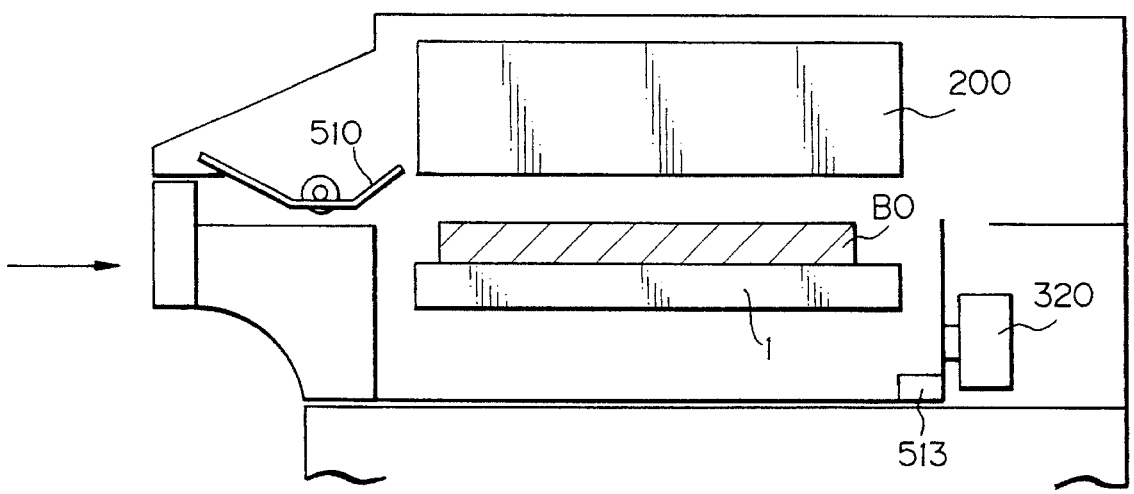
Figure 37:
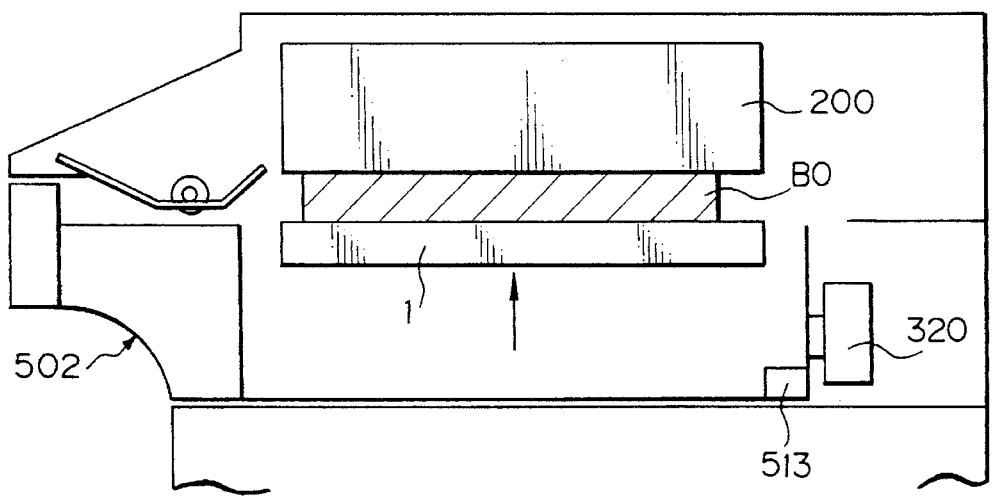

After the drawing and inserting operation has been locked, the tables 1 are raised for a predetermined period of time. As a result, the spread pages of the book BO are pressed against the guide rollers 511, as shown in FIG. 35. Then, the draw lock device 513 unlocks the drawing and inserting operation and allows the operator to insert the table unit 35 deeper into the housing. As shown in FIG. 36, when the table unit 35 reaches the deepest position in the housing, the lock sensor 320 senses it and causes the lock device 302 to lock the table 35 in the deepest position. The lock device 302 may selectively engage or disengage a lock pawl provided on the casing with or from the table unit 35 via a solenoid. Subsequently, as shown in FIG. 37 the tables 1 are again raised for another predetermined period of time in order to compensate for the gap G (FIG. 32) between the lowermost surface of the guide plate 510 and the bottom of the scanning unit 200. Then, the operator enters a desired range of pages to be read and then presses a copy start button 508 (FIG. 28). In response, the TPS starts reading the book BO while turning the page thereof, as stated earlier.

Assume that after the movement of the table unit 35 has been unlocked by the draw lock device 513, the operator again pulls out the table unit 35 without inserting it deeper into the housing. Then, the tables 1 are once lowered and wait for the insertion of the table unit 35.

Another specific configuration of the means for fixing the front and rear covers of the book BO on the tables 1 will be described with reference to FIGS. 38–42. As shown, the fixing means has a removable flat strip 714 assigned to each of the two tables 1. The strip 714 is fixed to the associated table 1 at the front and the rear. The intermediate portion of the strip 714 is convex downward in the attaching direction. When the strip 714 is attached to the table 1, the intermediate portion is resiliently deformed to press the front or rear cover of the book BO against the table 1.

Figure 38:
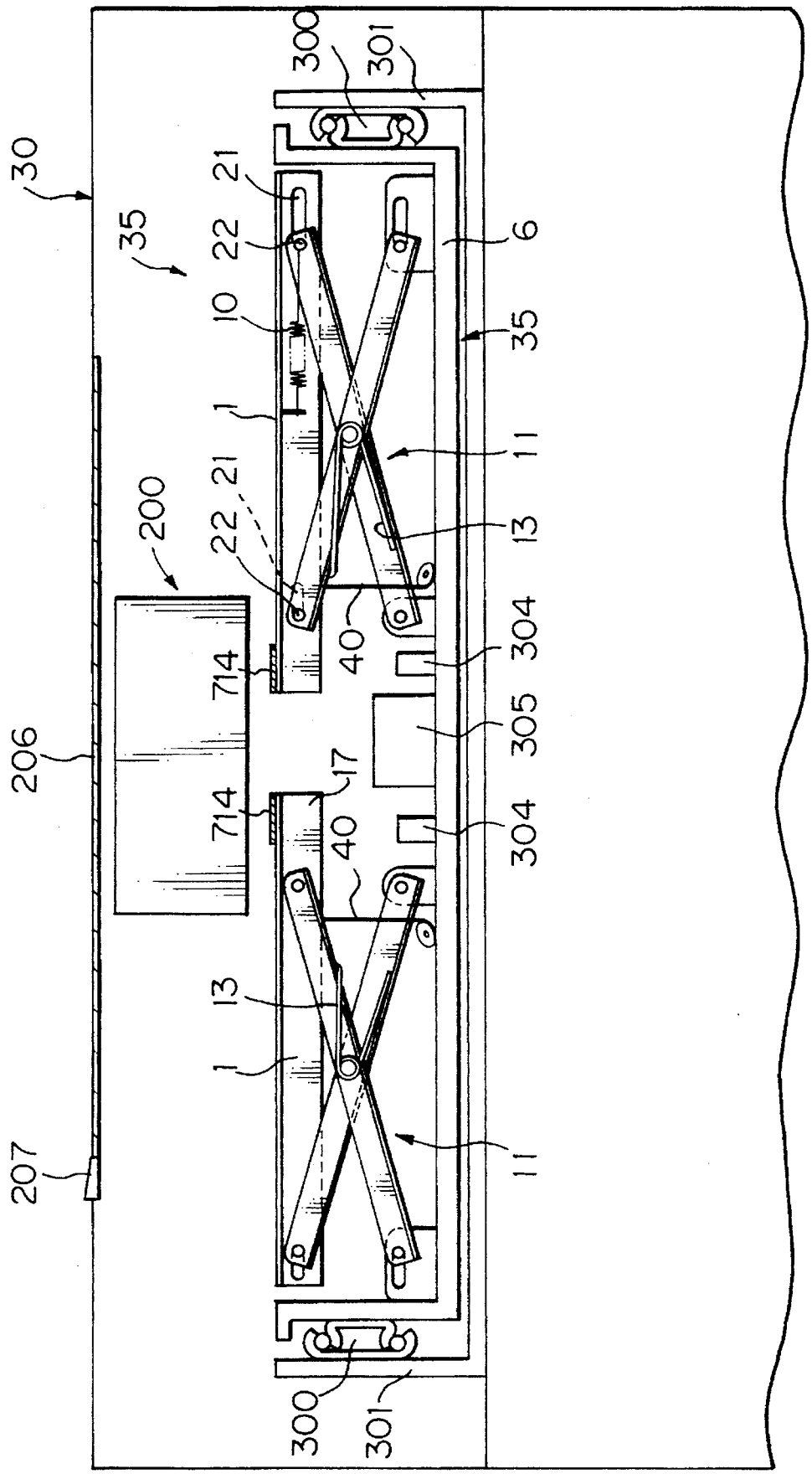
FIG. 38 is a section showing an alternative embodiment of the present invention.
Figure 39:
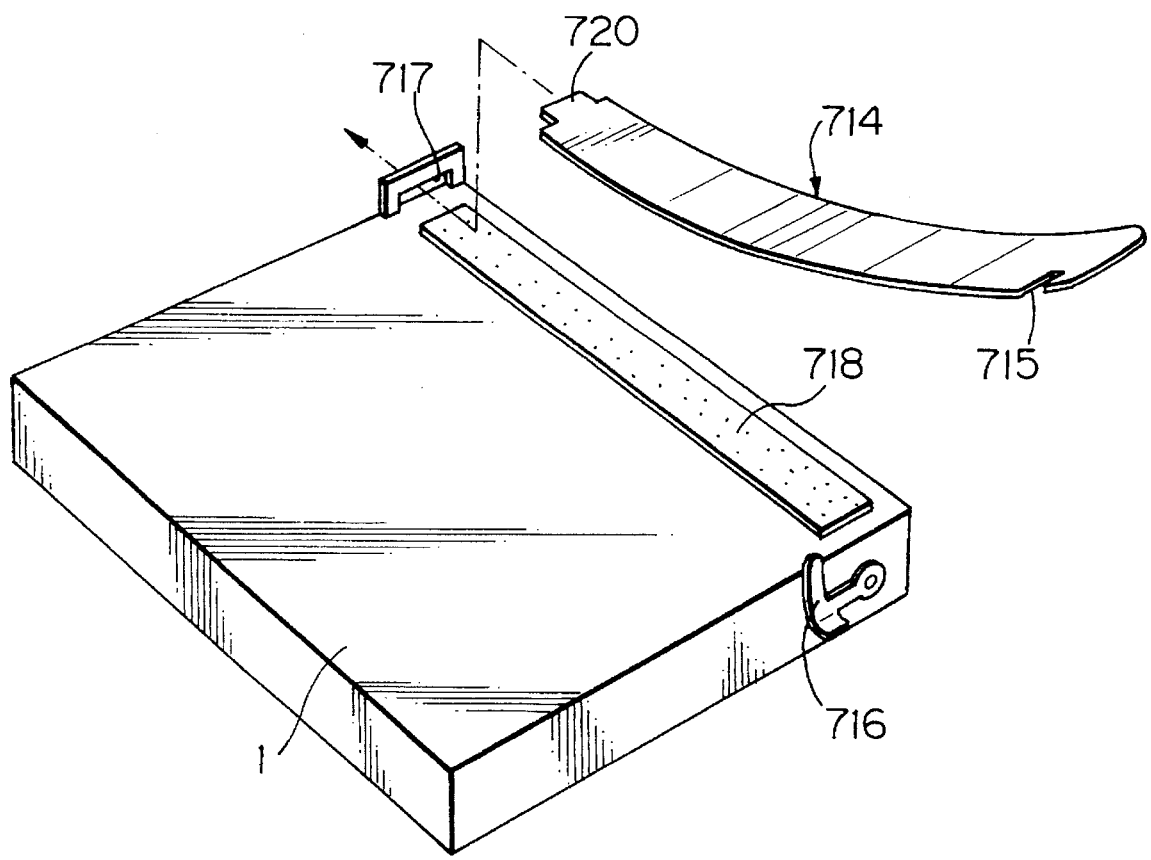
FIG. 39 is a perspective view showing how a pressing strip, included in the alternative embodiment, is attached to the table.
Figure 40:
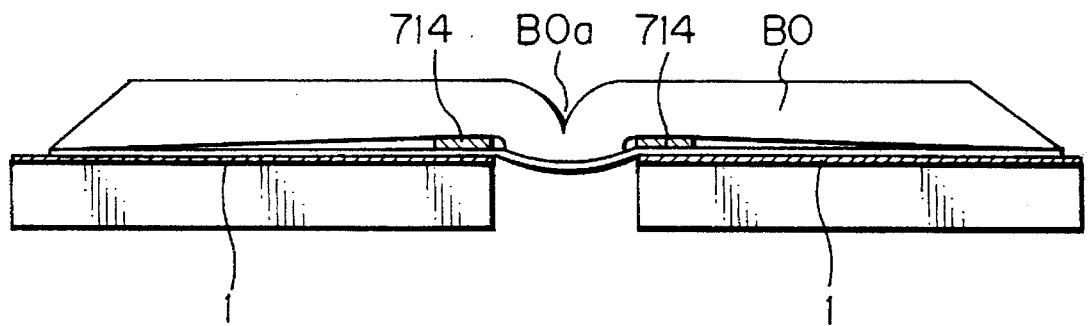
FIG. 40 is a side elevation showing a book set on the tables by the pressing strips.
Figure 41:
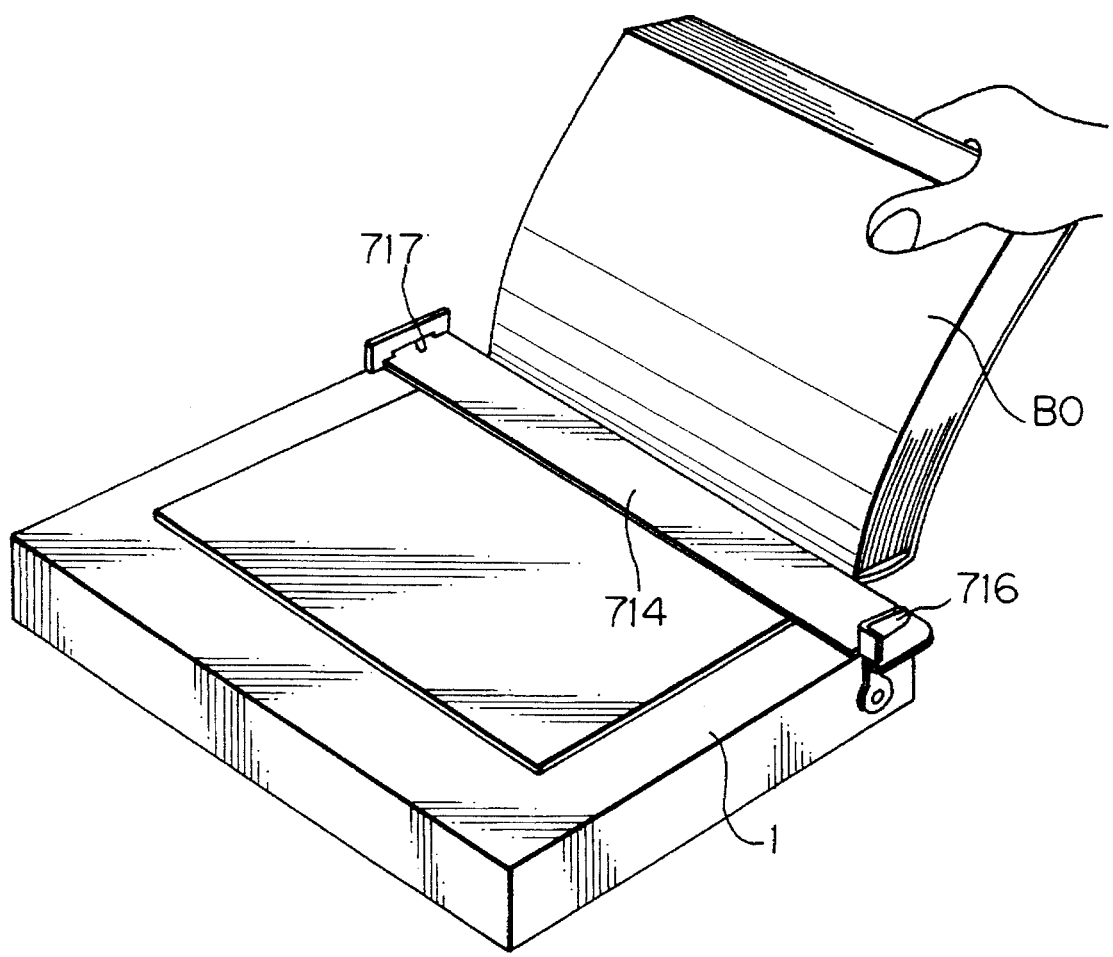
FIG. 41 is a perspective view of the strips pressing the book.
Figure 42:
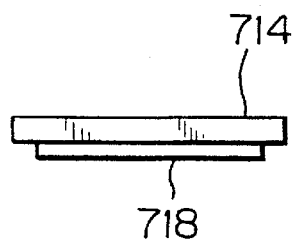
FIG. 42 is a front view of the pressing strip.

Specifically, as shown in FIGS. 38–40, two strips 714 are respectively removably mounted to the inner edges of the tables 1. Each strip 714 has a lug 720 at the rear end with respect to the front-and-rear direction of the table 1, and has a notch 715 at the front end. The table 1 has an opening 717 at the rear end and a hook 716 at the front end. As shown in FIG. 39, the lug 720 is inserted into the hole 717. As shown in FIGS. 40 and 41, when the strip 714 is attached to the predetermined position of the table 1, the hook 716 is caused to mate with the notch 715. In this manner, a mechanism for stopping the strip 714 is provided on the front of the table unit 35 and facilitates the operation of the strip 714.

An elongate rubber sheet 718 is fixed to part of the top of each table 1 adjoining the center of the TPS (FIG. 39) and the bottom of each strip 714 (FIG. 42) in order to surely fix the cover of the book BO. In the illustrative embodiment, the strips 714 are made of resilient stainless steel and convex downward. Hence, when the strips 714 are attached to the tables 1, their intermediate portions resiliently deform and surely press the opposite covers of the book BO against the tables 1, as shown in FIGS. 40 and 41. It is noteworthy that the strips 714, adjoining the inner edges of the tables 1, press the front and rear covers of the book BO in the vicinity of the bound portion BOa, thereby more surely fixing the book BO on the tables 1.

Again, as shown in FIG. 38, the left table 1 is movable only in the up-and-down direction to prevent the book BO from being displaced. On the other hand, the right table 1 is movable not only in the up-and-down direction but also in the right-and-left direction as viewed in FIG. 38. The slide shaft 22 and slot 21 cooperate to delimit the movable range of the right table 1, as stated earlier.

As stated above, the presser plates are implemented as flat strips which are removably attached to the tables 1 at the front and rear ends thereof. This facilitates the loading and unloading of the book BO from the tables 1. Further, the strips can be surely affixed to the tables 1 without damaging the book BO. In addition, because the strips are convex downward at their intermediate portions, the intermediate portions resiliently deform when the strips are attached to the tables 1, thereby pressing the covers of the book BO against the tables 1. Hence, the strips can surely fix the book BO in place even when the size thereof is reduced. This simplifies the construction and reduces the cost of the TPS.

In summary, it will be seen that the present invention provides a book document handling device having provided unprecedented advantages, as enumerated below.

(1) The operator can pull out document tables to the front of the device in the event of loading the tables with a book document. This facilitates the book loading operation because it is performed at the front of the device.

(2) A contact glass or similar cover plate for covering the spread pages of the book is not provided on the tables. Hence, the operator should only spread the document, set it on the tables, and then insert the tables into the device.

(3) Because the tables can be pulled out and pushed into the device at the front of the device, a minimum of labor is required in the human engineering aspect. In addition, the device is easier and safer to operate than a device which requires the operator to open and close a scanning section in the up-and-down direction.

(4) Because the front and rear covers of the book are respectively fixed to two tables, the operation remains stable when the tables are raised or lowered from any position. The book is, therefore, prevented from being displaced or otherwise moved when the table unit is pulled out of or pushed into the device.

(5) Before the table unit is pulled out of or pushed into the device, the tables are lowered. Hence, the book is protected frown damage during the course of movement of the table unit. In addition, the table unit can be moved into and out of the device smoothly.

(6) During the course of insertion of the table unit, the tables are once raised in order to press the spread pages of the book against a guide plate. Therefore, the document can be set with the spread pages held in an ideal condition. This obviates the jam of the document pages.

(7) Guide rollers are mounted on the guide plate and roll in the same direction as the book being pulled out of or pushed into the device. This allows the table unit to move smoothly into or out of the device and thereby frees the pages of the book from folding, creasing, tearing, etc.

(8) A scanning unit section and a table unit section are accessible when a scanning unit is opened, thereby facilitating the jam removal.

Various modifications will become possible for those skilled in the art after receiving the teachings of the present disclosure without departing from the scope thereof.

What is claimed is:

1. A book document handling device comprising:

a document table for laying a book document in a spread position with spread pages of said book document facing upward;

page turning means for turning the pages of the book document by scanning the spread pages;

reading means for reading the book document; and a scanning unit supporting said page turning means and said reading means for allowing said page turning means and said reading means to scan the book document;

said scanning unit being movable in a reciprocating motion for turning the pages of the book document while reading said book document;

said document table comprising:

a pair of separate document tables positioned side by side;

moving means for causing said pair of document tables to move up and down independently of each other such that each of said pair of document tables is movable independent of the other;

fixing means for fixing a front and a rear cover of the book document to said pair of document tables, respectively; and supporting means for supporting said pair of document tables in such a manner as to be movable relative to a body of said device;

wherein said fixing means fixes the front cover and the rear cover at a location adjacent to a binding of said book document.

2. A book document handling device as recited in claim 1, further including means for moving one of said pair of document tables in a horizontal direction relative to another of said pair of document tables to vary a horizontal spacing between said pair of document tables.

3. A book document handling device as recited in claim 1, wherein said moving means comprises a one-way clutch associated with each of said pair of document tables.

4. A book document handling device as recited in claim 1, further including a contact glass for non-book documents, and wherein said scanning unit is disposed between said contact glass and said pair of document tables.

5. A book document handling device comprising:

a document table for laying a book document in a spread position with spread pages of said book document facing upward;

page turning means for turning the pages of the book document by scanning the spread pages;

reading means for reading the book document; and a scanning unit supporting page turning means and said reading means for allowing said page turning means and said reading means to scan the book document;

said scanning unit being movable in a reciprocating motion for turning the pages of the book document while reading said book document;

said document table comprising:

a pair of separate document tables positioned side by side in a;

moving means for causing said pair of document tables to move up and down;

fixing means for fixing a front and a rear cover of the book document to said pair of document tables, respectively;

supporting means for supporting said pair of document tables in such a manner as to be movable relative to a body of said device in a; and control means for causing said moving means to lower said pair of document tables when said document tables are pulled out of said body or to raise said document tables when said document tables are pushed into said body.

6. A device as claimed in claim 5, further comprising a guide plate having a guide surface lower in level than a plane in which the book document is scanned.

7. A device as claimed in claim 6, wherein said control means causes said moving means to raise, when said document table is to be set in said body, said document table to a first position where the spread pages of the book document contact said guide plate before said supporting means reaches said predetermined book document reading position, and to further raise, after said supporting means has arrived at said predetermined book document reading position, said document table to a second position where said spread pages are positioned in said plane.

8. A device as claimed in claim 7, wherein said guide plate is convex downward and comprises a plurality of guide rollers which are rollably supported and protrude from a lowermost surface of said guide plate.

9. A book document handling device comprising:

a document table for laying a book document in a spread position with spread pages of said book document facing upward;

page turning means for turning the page of the book document by scanning the spread pages;

reading means for reading the book document;

a scanning unit supporting said page turning means and said reading means for allowing said page turning means and said reading means to scan the book document; and a scanner unit supporting said scanning unit and movable in a reciprocating motion for turning the pages of the book document while reading said book document;

said document table comprising:

a pair of separate document tables positioned side by side;

moving means for causing said pair of document tables to move up and down;

fixing means for fixing a front and a rear cover of the book document to said pair of document tables, respectively; and supporting means for supporting said pair of document tables in such a manner as to be movable between an inserted position and a withdrawn position to allow insertion and withdrawal of said book document;

said scanner unit being positioned above said document table, and forming part of said body, and hinged to said body to allow said pair of book document tables to be exposed to the outside when said document tables are in said inserted position;

wherein said fixing means fixes the front cover and the rear cover at a location adjacent to a binding of said book document.

10. A book document handling device as recited in claim 9, further including means for moving one of said pair of document tables in a horizontal direction relative to another of said pair of document tables to vary a horizontal spacing between said pair of document tables.

11. A book document handling device as recited in claim 9, wherein said moving means comprises a one-way clutch associated with each of said pair of document tables.

12. A book document handling device as recited in claim 9, further including a contact glass for non-book documents, and wherein said scanning unit is disposed between said contact glass and said pair of document tables.

13. A book document handling device comprising:

a document table for laying a book document in a spread position with spread pages of said book document facing upward;

page turning means for turning the pages of the book document by scanning the spread pages;

reading means for reading the book document; and a scanning unit supporting said page turning means and said reading means for allowing said page turning means and said reading means to scan the book document;

said scanning unit being movable in a reciprocating motion for turning the pages of the book document while reading said book document;

said document table comprising:

a pair of separate document tables positioned side by side;

moving means for causing said pair of document tables to move up and down independently of each other such that each of said pair of document tables is movable independent of the other;

fixing means for fixing a front and a rear cover of the book document to said pair of document tables, respectively; and supporting means for supporting said pair of document tables in such a manner as to be movable relative to a body of said device;

wherein said fixing means includes a first member and a second member associated with each of said pair of document tables such that the front cover and the rear cover of the book document are respectively fixed between said first member and said second member of each of said pair of document tables, and wherein said second member comprises at least one resilient portion.

14. A book document handling device as recited in claim 13, wherein said fixing means fixes the front cover and the rear cover at a location adjacent to a binding of said book document.

15. A book document handling device comprising:

a document table for laying a book document in a spread position with spread pages of said book document facing upward;

page turning means for turning the pages of the book document by scanning the spread pages;

reading means for reading the book document; and a scanning unit supporting said page turning means and said reading means for allowing said page turning means and said reading means to scan the book document;

said scanning unit being movable in a reciprocating motion for turning the pages of the book document while reading said book document;

said document table comprising:

a pair of separate document tables positioned side by side;

moving means for causing said pair of document tables to move up and down independently of each other such that each of said pair of document tables is movable independent of the other;

fixing means for fixing a front and a rear cover of the book document to said pair of document tables, respectively; and supporting means for supporting said pair of document tables in such a manner as to be movable relative to a body of said device;

the book document handling device further including lock means for preventing movement of said supporting means.

16. A book document handling device as recited in claim 15, further including control means for controlling said locking means in response to position information of said scanning unit.

17. A book document handling device comprising:

a document table for laying a book document in a spread position with spread pages of said book document facing upward;

page turning means for turning the page of the book document by scanning the spread pages;

reading means for reading the book document;

a scanning unit supporting said page turning means and said reading means for allowing said page turning means and said reading means to scan the book document; and a scanner unit supporting said scanning unit and movable in a reciprocating motion for turning the pages of the book document while reading said book document;

said document table comprising:

a pair of separate document tables positioned side by side;

moving means for causing said pair of document tables to move up and down;

fixing means for fixing a front and a rear cover of the book document to said pair of document tables, respectively; and supporting means for supporting said pair of document tables in such a manner as to be movable between an inserted position and a withdrawn position to allow insertion and withdrawal of said book document;

said scanner unit being positioned above said document table, and forming part of said body, and hinged to said body to allow said pair of book document tables to be exposed to the outside when said document tables are in said inserted position;

wherein said fixing means includes a first member and a second member associated with each of said pair of document tables such that the front cover and the rear cover of the book document are respectively fixed between said first member and said second member of each of said pair of document tables, and wherein said second member comprises at least one resilient portion.

18. A book document handling device as recited in claim 17, wherein said fixing means fixes the front cover and the rear cover at a location adjacent to a binding of said book document.

19. A book document handling device comprising:

a document table for laying a book document in a spread position with spread pages of said book document facing upward;

page turning means for turning the page of the book document by scanning the spread pages;

reading means for reading the book document;

a scanning unit supporting said page turning means and said reading means for allowing said page turning means and said reading means to scan the book document; and a scanner unit supporting said scanning unit and movable in a reciprocating motion for turning the pages of the book document while reading said book document;

said document table comprising:

a pair of separate document tables positioned side by side;

moving means for causing said pair of document tables to move up and down;

fixing means for fixing a front and a rear cover of the book document to said pair of document tables, respectively; and supporting means for supporting said pair of document tables in such a manner as to be movable between an inserted position and a withdrawn position to allow insertion and withdrawal of said book document;

said scanner unit being positioned above said document table, and forming part of said body, and hinged to said body to allow said pair of book document tables to be exposed to the outside when said document tables are in said inserted position;

the book document handling device further including lock means for preventing movement of said supporting means.

20. A book document handling device as recited in claim 19, further including control means for controlling said locking means in response to position information of said scanning unit.

* * * * *